United States Patent
Meiklejohn et al.

(10) Patent No.: US 9,043,696 B1
(45) Date of Patent: May 26, 2015

(54) SYSTEMS AND METHODS FOR VISUAL DEFINITION OF DATA ASSOCIATIONS

(71) Applicant: Palantir Technologies, Inc., Palo Alto, CA (US)

(72) Inventors: David Meiklejohn, Arlington, VA (US); Matthew Fedderly, McLean, VA (US); Joseph Henke, Millersville, MD (US); Yichen Xing, Vienna, VA (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

(21) Appl. No.: 14/192,767

(22) Filed: Feb. 27, 2014

Related U.S. Application Data

(60) Provisional application No. 61/923,536, filed on Jan. 3, 2014.

(51) Int. Cl.
*G06F 15/16* (2006.01)
*G06F 17/22* (2006.01)

(52) U.S. Cl.
CPC .................................. *G06F 17/2247* (2013.01)

(58) Field of Classification Search
CPC ................................................. G06F 17/30896
USPC .......................................................... 715/234
See application file for complete search history.

(56) References Cited

U.S. PATENT DOCUMENTS

| | | | |
|---|---|---|---|
| 5,109,399 A | 4/1992 | Thompson | |
| 5,329,108 A | 7/1994 | Lamoure | |
| 5,632,987 A | 5/1997 | Rao et al. | |
| 5,670,987 A | 9/1997 | Doi et al. | |
| 5,724,575 A | 3/1998 | Hoover et al. | |
| 5,781,704 A | 7/1998 | Rossmo | |
| 5,826,021 A | 10/1998 | Mastors et al. | |
| 5,832,218 A | 11/1998 | Gibbs et al. | |
| 5,845,300 A | 12/1998 | Comer | |
| 5,872,973 A | 2/1999 | Mitchell et al. | |

(Continued)

FOREIGN PATENT DOCUMENTS

| | | |
|---|---|---|
| DE | 102014103482 | 9/2014 |
| EP | 1672527 | 6/2006 |

(Continued)

OTHER PUBLICATIONS

Yudong, HTML page analysis based on visual cues, 2001, pp. 859-864.*

(Continued)

*Primary Examiner* — Cesar Paula
*Assistant Examiner* — Mohammed-Ibrahim Zuberi
(74) *Attorney, Agent, or Firm* — Finnegan, Henderson, Farabow, Garrett & Dunner, LLP

(57) ABSTRACT

Systems and methods are disclosed for visual definitions of data associations. In accordance with one implementation, a method is provided for visual definitions of data associations. The method includes obtaining and displaying a first sample document, receiving a first input indicating selection of one or more objects within the first sample document, and determining a first set of one or more characteristics shared by the selected objects. The method also includes identifying, within one or more target documents, one or more target objects characterized by the first set of one or more characteristics, and storing object data associated with the target objects.

14 Claims, 12 Drawing Sheets

(56) References Cited

U.S. PATENT DOCUMENTS

| | | |
|---|---|---|
| 5,878,434 A | 3/1999 | Draper et al. |
| 5,897,636 A | 4/1999 | Kaeser |
| 5,966,706 A | 10/1999 | Biliris et al. |
| 6,006,242 A | 12/1999 | Poole et al. |
| 6,057,757 A | 5/2000 | Arrowsmith et al. |
| 6,073,129 A | 6/2000 | Levine et al. |
| 6,091,956 A | 7/2000 | Hollenberg |
| 6,134,582 A | 10/2000 | Kennedy |
| 6,161,098 A | 12/2000 | Wallman |
| 6,219,053 B1 | 4/2001 | Tachibana et al. |
| 6,232,971 B1 | 5/2001 | Haynes |
| 6,243,717 B1 | 6/2001 | Gordon et al. |
| 6,247,019 B1 | 6/2001 | Davies |
| 6,279,018 B1 | 8/2001 | Kudrolli et al. |
| 6,304,873 B1 | 10/2001 | Klein et al. |
| 6,341,310 B1 | 1/2002 | Leshem et al. |
| 6,366,933 B1 * | 4/2002 | Ball et al. ............... 715/203 |
| 6,369,835 B1 | 4/2002 | Lin |
| 6,418,438 B1 | 7/2002 | Campbell |
| 6,456,997 B1 | 9/2002 | Shukla |
| 6,510,504 B2 | 1/2003 | Satyanarayanan |
| 6,519,627 B1 | 2/2003 | Dan et al. |
| 6,549,944 B1 | 4/2003 | Weinberg et al. |
| 6,560,620 B1 * | 5/2003 | Ching ...................... 715/229 |
| 6,574,635 B2 | 6/2003 | Stauber et al. |
| 6,581,068 B1 | 6/2003 | Bensoussan et al. |
| 6,594,672 B1 | 7/2003 | Lampson et al. |
| 6,631,496 B1 | 10/2003 | Li et al. |
| 6,714,936 B1 | 3/2004 | Nevin, III |
| 6,745,382 B1 | 6/2004 | Zothner |
| 6,775,675 B1 | 8/2004 | Nwabueze et al. |
| 6,828,920 B2 | 12/2004 | Owen et al. |
| 6,839,745 B1 | 1/2005 | Dingari et al. |
| 6,877,137 B1 | 4/2005 | Rivette et al. |
| 6,976,210 B1 * | 12/2005 | Silva et al. ............... 715/205 |
| 6,985,950 B1 | 1/2006 | Hanson et al. |
| 7,036,085 B2 | 4/2006 | Barros |
| 7,043,702 B2 | 5/2006 | Chi et al. |
| 7,055,110 B2 | 5/2006 | Kupka et al. |
| 7,058,648 B1 | 6/2006 | Lightfoot et al. |
| 7,111,231 B1 | 9/2006 | Huck et al. |
| 7,139,800 B2 | 11/2006 | Bellotti et al. |
| 7,158,878 B2 | 1/2007 | Rasmussen et al. |
| 7,162,475 B2 | 1/2007 | Ackerman |
| 7,168,039 B2 | 1/2007 | Bertram |
| 7,171,427 B2 | 1/2007 | Witkowski |
| 7,269,786 B1 | 9/2007 | Malloy et al. |
| 7,278,105 B1 | 10/2007 | Kitts |
| 7,290,698 B2 | 11/2007 | Poslinski et al. |
| 7,333,998 B2 | 2/2008 | Heckerman et al. |
| 7,370,047 B2 | 5/2008 | Gorman |
| 7,379,811 B2 | 5/2008 | Rasmussen et al. |
| 7,379,903 B2 | 5/2008 | Caballero |
| 7,403,942 B1 | 7/2008 | Bayliss |
| 7,426,654 B2 | 9/2008 | Adams et al. |
| 7,454,466 B2 | 11/2008 | Bellotti et al. |
| 7,461,158 B2 | 12/2008 | Rider et al. |
| 7,467,375 B2 | 12/2008 | Tondreau et al. |
| 7,502,786 B2 | 3/2009 | Liu et al. |
| 7,525,422 B2 | 4/2009 | Bishop et al. |
| 7,529,727 B2 | 5/2009 | Arning et al. |
| 7,558,677 B2 | 7/2009 | Jones |
| 7,574,428 B2 | 8/2009 | Leiserowitz et al. |
| 7,579,965 B2 | 8/2009 | Bucholz |
| 7,596,285 B2 | 9/2009 | Brown et al. |
| 7,617,232 B2 | 11/2009 | Gabbert et al. |
| 7,620,628 B2 | 11/2009 | Kapur et al. |
| 7,627,812 B2 | 12/2009 | Chamberlain et al. |
| 7,634,717 B2 | 12/2009 | Chamberlain et al. |
| 7,703,021 B1 | 4/2010 | Flam |
| 7,712,049 B2 | 5/2010 | Williams et al. |
| 7,716,077 B1 | 5/2010 | Mikurak |
| 7,725,530 B2 * | 5/2010 | Sah et al. ............... 709/203 |
| 7,725,547 B2 | 5/2010 | Albertson et al. |
| 7,725,728 B2 | 5/2010 | Ama et al. |
| 7,730,082 B2 * | 6/2010 | Sah et al. ............... 707/770 |
| 7,730,109 B2 * | 6/2010 | Rohrs et al. ............... 707/803 |
| 7,757,220 B2 | 7/2010 | Griffith et al. |
| 7,770,100 B2 | 8/2010 | Chamberlain et al. |
| 7,805,457 B1 | 9/2010 | Viola et al. |
| 7,809,703 B2 | 10/2010 | Balabhadrapatruni et al. |
| 7,818,658 B2 | 10/2010 | Chen |
| 7,894,984 B2 | 2/2011 | Rasmussen et al. |
| 7,899,611 B2 | 3/2011 | Downs et al. |
| 7,912,842 B1 | 3/2011 | Bayliss |
| 7,917,376 B2 | 3/2011 | Bellin et al. |
| 7,920,963 B2 | 4/2011 | Jouline et al. |
| 7,933,862 B2 | 4/2011 | Chamberlain et al. |
| 7,962,281 B2 | 6/2011 | Rasmussen et al. |
| 7,962,848 B2 | 6/2011 | Bertram |
| 7,970,240 B1 | 6/2011 | Chao et al. |
| 7,984,374 B2 * | 7/2011 | Caro et al. ............... 715/255 |
| 8,001,465 B2 | 8/2011 | Kudrolli et al. |
| 8,001,482 B2 | 8/2011 | Bhattiprolu et al. |
| 8,010,545 B2 | 8/2011 | Stefik et al. |
| 8,015,487 B2 | 9/2011 | Roy et al. |
| 8,024,778 B2 | 9/2011 | Cash et al. |
| 8,036,632 B1 | 10/2011 | Cona et al. |
| 8,041,714 B2 | 10/2011 | Aymeloglu et al. |
| 8,103,543 B1 | 1/2012 | Zwicky |
| 8,112,425 B2 | 2/2012 | Baum et al. |
| 8,126,848 B2 | 2/2012 | Wagner |
| 8,134,457 B2 | 3/2012 | Velipasalar et al. |
| 8,145,703 B2 | 3/2012 | Frishert et al. |
| 8,185,819 B2 * | 5/2012 | Sah et al. ............... 715/243 |
| 8,214,361 B1 | 7/2012 | Sandler et al. |
| 8,214,764 B2 | 7/2012 | Gemmell et al. |
| 8,225,201 B2 | 7/2012 | Michael |
| 8,229,947 B2 | 7/2012 | Fujinaga |
| 8,230,333 B2 | 7/2012 | Decherd et al. |
| 8,280,880 B1 | 10/2012 | Aymeloglu et al. |
| 8,290,942 B2 | 10/2012 | Jones et al. |
| 8,301,464 B1 | 10/2012 | Cave et al. |
| 8,301,904 B1 | 10/2012 | Gryaznov |
| 8,312,546 B2 | 11/2012 | Alme |
| 8,352,881 B2 | 1/2013 | Champion et al. |
| 8,364,642 B1 | 1/2013 | Garrod |
| 8,368,695 B2 | 2/2013 | Howell et al. |
| 8,397,171 B2 | 3/2013 | Klassen et al. |
| 8,412,707 B1 | 4/2013 | Mianji |
| 8,447,722 B1 | 5/2013 | Ahuja et al. |
| 8,452,790 B1 | 5/2013 | Mianji |
| 8,463,036 B1 | 6/2013 | Ramesh et al. |
| 8,489,331 B2 | 7/2013 | Kopf et al. |
| 8,489,641 B1 | 7/2013 | Seefeld et al. |
| 8,494,984 B2 | 7/2013 | Ito et al. |
| 8,504,542 B2 | 8/2013 | Chang et al. |
| 8,514,082 B2 | 8/2013 | Cova et al. |
| 8,515,207 B2 | 8/2013 | Chau |
| 8,554,579 B2 | 10/2013 | Tribble et al. |
| 8,554,709 B2 | 10/2013 | Goodson et al. |
| 8,577,911 B1 | 11/2013 | Stepinski et al. |
| 8,589,273 B2 | 11/2013 | Creeden et al. |
| 8,601,326 B1 | 12/2013 | Kirn |
| 8,620,641 B2 | 12/2013 | Farnsworth et al. |
| 8,646,080 B2 | 2/2014 | Williamson et al. |
| 8,676,857 B1 | 3/2014 | Adams et al. |
| 8,689,108 B1 | 4/2014 | Duffield et al. |
| 8,713,467 B1 | 4/2014 | Goldenberg et al. |
| 8,726,379 B1 | 5/2014 | Stiansen et al. |
| 8,739,278 B2 | 5/2014 | Varghese |
| 8,742,934 B1 | 6/2014 | Sarpy et al. |
| 8,745,516 B2 | 6/2014 | Mason et al. |
| 8,781,169 B2 | 7/2014 | Jackson et al. |
| 8,787,939 B2 | 7/2014 | Papakipos et al. |
| 8,799,799 B1 | 8/2014 | Cervelli et al. |
| 8,812,960 B1 | 8/2014 | Sun et al. |
| 8,830,322 B2 | 9/2014 | Nerayoff et al. |
| 8,832,594 B1 | 9/2014 | Thompson et al. |
| 8,917,274 B2 | 12/2014 | Ma et al. |
| 8,924,872 B1 | 12/2014 | Bogomolov et al. |
| 8,930,331 B2 | 1/2015 | McGrew et al. |
| 8,937,619 B2 | 1/2015 | Sharma et al. |
| 8,938,686 B1 | 1/2015 | Erenrich et al. |

(56) References Cited

U.S. PATENT DOCUMENTS

| | | |
|---|---|---|
| 2001/0051949 A1 | 12/2001 | Carey et al. |
| 2002/0033848 A1 | 3/2002 | Sciammarella et al. |
| 2002/0035590 A1 | 3/2002 | Eibach et al. |
| 2002/0065708 A1 | 5/2002 | Senay et al. |
| 2002/0091694 A1 | 7/2002 | Hrle et al. |
| 2002/0091707 A1 | 7/2002 | Keller |
| 2002/0095658 A1 | 7/2002 | Shulman |
| 2002/0116120 A1 | 8/2002 | Ruiz et al. |
| 2002/0174201 A1 | 11/2002 | Ramer et al. |
| 2003/0028560 A1 | 2/2003 | Kudrolli et al. |
| 2003/0039948 A1 | 2/2003 | Donahue |
| 2003/0093401 A1 | 5/2003 | Czahkowski et al. |
| 2003/0105759 A1 | 6/2003 | Bess et al. |
| 2003/0115481 A1 | 6/2003 | Baird et al. |
| 2003/0120675 A1 | 6/2003 | Stauber et al. |
| 2003/0144868 A1 | 7/2003 | MacIntyre et al. |
| 2003/0163352 A1 | 8/2003 | Surpin et al. |
| 2003/0182313 A1 | 9/2003 | Federwisch et al. |
| 2003/0212718 A1 | 11/2003 | Tester |
| 2003/0225755 A1 | 12/2003 | Iwayama et al. |
| 2004/0003009 A1 | 1/2004 | Wilmot |
| 2004/0006523 A1 | 1/2004 | Coker |
| 2004/0064256 A1 | 4/2004 | Barinek et al. |
| 2004/0085318 A1 | 5/2004 | Hassler et al. |
| 2004/0095349 A1 | 5/2004 | Bito et al. |
| 2004/0111410 A1 | 6/2004 | Burgoon et al. |
| 2004/0117345 A1 | 6/2004 | Bamford et al. |
| 2004/0117387 A1 | 6/2004 | Civetta et al. |
| 2004/0143602 A1 | 7/2004 | Ruiz et al. |
| 2004/0148301 A1 | 7/2004 | McKay et al. |
| 2004/0153451 A1 | 8/2004 | Phillips et al. |
| 2004/0163039 A1 | 8/2004 | Gorman |
| 2004/0210763 A1 | 10/2004 | Jonas |
| 2004/0260702 A1 | 12/2004 | Cragun et al. |
| 2005/0027705 A1 | 2/2005 | Sadri et al. |
| 2005/0028094 A1 | 2/2005 | Allyn |
| 2005/0080769 A1 | 4/2005 | Gemmell et al. |
| 2005/0086207 A1 | 4/2005 | Heuer et al. |
| 2005/0097441 A1 | 5/2005 | Herbach et al. |
| 2005/0108231 A1 | 5/2005 | Findleton et al. |
| 2005/0114763 A1 | 5/2005 | Nonomura et al. |
| 2005/0125715 A1 | 6/2005 | Franco et al. |
| 2005/0162523 A1 | 7/2005 | Darrell et al. |
| 2005/0180330 A1 | 8/2005 | Shapiro |
| 2005/0182793 A1 | 8/2005 | Keenan et al. |
| 2005/0183005 A1 | 8/2005 | Denoue et al. |
| 2005/0246327 A1 | 11/2005 | Yeung et al. |
| 2005/0251786 A1 | 11/2005 | Citron et al. |
| 2005/0262493 A1 | 11/2005 | Schmidt et al. |
| 2005/0262512 A1 | 11/2005 | Schmidt et al. |
| 2005/0289524 A1 | 12/2005 | McGinnes |
| 2006/0010130 A1 | 1/2006 | Leff et al. |
| 2006/0026120 A1 | 2/2006 | Carolan et al. |
| 2006/0026170 A1 | 2/2006 | Kreitler et al. |
| 2006/0059139 A1 | 3/2006 | Robinson |
| 2006/0074881 A1 | 4/2006 | Vembu et al. |
| 2006/0080316 A1 | 4/2006 | Gilmore et al. |
| 2006/0080619 A1 | 4/2006 | Carlson et al. |
| 2006/0116991 A1 | 6/2006 | Calderwood |
| 2006/0129746 A1 | 6/2006 | Porter |
| 2006/0139375 A1 | 6/2006 | Rasmussen et al. |
| 2006/0149596 A1 | 7/2006 | Surpin et al. |
| 2006/0161558 A1 | 7/2006 | Tamma et al. |
| 2006/0203337 A1 | 9/2006 | White |
| 2006/0218206 A1 | 9/2006 | Bourbonnais et al. |
| 2006/0218491 A1 | 9/2006 | Grossman et al. |
| 2006/0218637 A1 | 9/2006 | Thomas et al. |
| 2006/0241974 A1 | 10/2006 | Chao et al. |
| 2006/0242040 A1 | 10/2006 | Rader |
| 2006/0242630 A1* | 10/2006 | Koike et al. .................. 717/136 |
| 2006/0253502 A1 | 11/2006 | Raman et al. |
| 2006/0265397 A1 | 11/2006 | Bryan et al. |
| 2006/0271277 A1 | 11/2006 | Hu et al. |
| 2006/0279630 A1 | 12/2006 | Aggarwal et al. |
| 2007/0011150 A1 | 1/2007 | Frank |
| 2007/0016363 A1 | 1/2007 | Huang et al. |
| 2007/0038962 A1 | 2/2007 | Fuchs et al. |
| 2007/0050429 A1 | 3/2007 | Goldring et al. |
| 2007/0057966 A1 | 3/2007 | Ohno et al. |
| 2007/0061487 A1 | 3/2007 | Moore et al. |
| 2007/0067285 A1 | 3/2007 | Blume |
| 2007/0078832 A1 | 4/2007 | Ott et al. |
| 2007/0143253 A1 | 6/2007 | Kostamaa et al. |
| 2007/0174760 A1 | 7/2007 | Chamberlain et al. |
| 2007/0192265 A1 | 8/2007 | Chopin et al. |
| 2007/0208497 A1 | 9/2007 | Downs et al. |
| 2007/0208498 A1 | 9/2007 | Barker et al. |
| 2007/0208736 A1 | 9/2007 | Tanigawa et al. |
| 2007/0233756 A1 | 10/2007 | D'Souza et al. |
| 2007/0240062 A1 | 10/2007 | Christena et al. |
| 2007/0266336 A1 | 11/2007 | Nojima et al. |
| 2007/0271317 A1 | 11/2007 | Carmel |
| 2007/0294643 A1 | 12/2007 | Kyle |
| 2008/0005063 A1 | 1/2008 | Seeds |
| 2008/0015970 A1 | 1/2008 | Brookfield et al. |
| 2008/0040684 A1 | 2/2008 | Crump |
| 2008/0051989 A1 | 2/2008 | Welsh |
| 2008/0052142 A1 | 2/2008 | Bailey et al. |
| 2008/0077597 A1 | 3/2008 | Butler |
| 2008/0077642 A1 | 3/2008 | Carbone et al. |
| 2008/0104019 A1 | 5/2008 | Nath |
| 2008/0104149 A1 | 5/2008 | Vishniac et al. |
| 2008/0126951 A1 | 5/2008 | Sood et al. |
| 2008/0162616 A1 | 7/2008 | Gross et al. |
| 2008/0195417 A1 | 8/2008 | Surpin et al. |
| 2008/0195608 A1 | 8/2008 | Clover |
| 2008/0195672 A1 | 8/2008 | Hamel et al. |
| 2008/0201339 A1 | 8/2008 | McGrew |
| 2008/0222295 A1 | 9/2008 | Robinson et al. |
| 2008/0255973 A1 | 10/2008 | El Wade et al. |
| 2008/0263468 A1 | 10/2008 | Cappione et al. |
| 2008/0267107 A1 | 10/2008 | Rosenberg |
| 2008/0270316 A1 | 10/2008 | Guidotti et al. |
| 2008/0276167 A1 | 11/2008 | Michael |
| 2008/0278311 A1 | 11/2008 | Grange et al. |
| 2008/0288306 A1 | 11/2008 | MacIntyre et al. |
| 2008/0288475 A1* | 11/2008 | Kim et al. .................. 707/4 |
| 2008/0301643 A1 | 12/2008 | Appleton et al. |
| 2009/0002492 A1 | 1/2009 | Velipasalar et al. |
| 2009/0027418 A1 | 1/2009 | Maru et al. |
| 2009/0030915 A1 | 1/2009 | Winter et al. |
| 2009/0031247 A1 | 1/2009 | Walter et al. |
| 2009/0055251 A1 | 2/2009 | Shah et al. |
| 2009/0088964 A1 | 4/2009 | Schaaf et al. |
| 2009/0106242 A1 | 4/2009 | McGrew |
| 2009/0106308 A1 | 4/2009 | Killian et al. |
| 2009/0119309 A1 | 5/2009 | Gibson et al. |
| 2009/0125369 A1 | 5/2009 | Kloostra et al. |
| 2009/0125459 A1 | 5/2009 | Norton et al. |
| 2009/0132921 A1 | 5/2009 | Hwangbo et al. |
| 2009/0132953 A1 | 5/2009 | Reed et al. |
| 2009/0144262 A1 | 6/2009 | White et al. |
| 2009/0164387 A1 | 6/2009 | Armstrong et al. |
| 2009/0164934 A1 | 6/2009 | Bhattiprolu et al. |
| 2009/0171939 A1 | 7/2009 | Athsani et al. |
| 2009/0172511 A1 | 7/2009 | Decherd et al. |
| 2009/0177962 A1 | 7/2009 | Gusmorino et al. |
| 2009/0179892 A1 | 7/2009 | Tsuda et al. |
| 2009/0222400 A1 | 9/2009 | Kupershmidt et al. |
| 2009/0222760 A1 | 9/2009 | Halverson et al. |
| 2009/0234720 A1 | 9/2009 | George et al. |
| 2009/0271435 A1 | 10/2009 | Yako et al. |
| 2009/0281839 A1 | 11/2009 | Lynn et al. |
| 2009/0287470 A1 | 11/2009 | Farnsworth et al. |
| 2009/0292626 A1 | 11/2009 | Oxford |
| 2009/0313223 A1 | 12/2009 | Rantanen |
| 2009/0313311 A1 | 12/2009 | Hoffmann et al. |
| 2010/0011282 A1 | 1/2010 | Dollard et al. |
| 2010/0036831 A1 | 2/2010 | Vemuri et al. |
| 2010/0042922 A1 | 2/2010 | Bradateanu et al. |
| 2010/0057716 A1 | 3/2010 | Stefik et al. |
| 2010/0070523 A1 | 3/2010 | Delgo et al. |
| 2010/0070531 A1 | 3/2010 | Aymeloglu et al. |
| 2010/0070897 A1 | 3/2010 | Aymeloglu et al. |

(56) References Cited

U.S. PATENT DOCUMENTS

| | | |
|---|---|---|
| 2010/0076939 A1 | 3/2010 | Iwaki et al. |
| 2010/0082541 A1 | 4/2010 | Kottomtharayil |
| 2010/0100963 A1 | 4/2010 | Mahaffey |
| 2010/0103124 A1 | 4/2010 | Kruzeniski et al. |
| 2010/0114817 A1 | 5/2010 | Broeder et al. |
| 2010/0114831 A1 | 5/2010 | Gilbert et al. |
| 2010/0122152 A1 | 5/2010 | Chamberlain et al. |
| 2010/0131457 A1 | 5/2010 | Heimendinger |
| 2010/0138842 A1 | 6/2010 | Balko et al. |
| 2010/0145909 A1 | 6/2010 | Ngo |
| 2010/0161565 A1 | 6/2010 | Lee et al. |
| 2010/0161688 A1 | 6/2010 | Kesselman et al. |
| 2010/0162176 A1 | 6/2010 | Dunton |
| 2010/0191563 A1 | 7/2010 | Schlaifer et al. |
| 2010/0191884 A1 | 7/2010 | Holenstein et al. |
| 2010/0198684 A1 | 8/2010 | Eraker et al. |
| 2010/0199225 A1 | 8/2010 | Coleman et al. |
| 2010/0211550 A1 | 8/2010 | Daniello et al. |
| 2010/0211618 A1 | 8/2010 | Anderson et al. |
| 2010/0228812 A1 | 9/2010 | Uomini |
| 2010/0235606 A1 | 9/2010 | Oreland et al. |
| 2010/0250412 A1 | 9/2010 | Wagner |
| 2010/0280857 A1 | 11/2010 | Liu et al. |
| 2010/0283787 A1 | 11/2010 | Hamedi et al. |
| 2010/0293174 A1 | 11/2010 | Bennett et al. |
| 2010/0306713 A1 | 12/2010 | Geisner et al. |
| 2010/0321399 A1 | 12/2010 | Ellren et al. |
| 2010/0325581 A1 | 12/2010 | Finkelstein et al. |
| 2010/0330801 A1 | 12/2010 | Rouh |
| 2011/0029498 A1 | 2/2011 | Ferguson et al. |
| 2011/0047159 A1 | 2/2011 | Baid et al. |
| 2011/0060753 A1 | 3/2011 | Shaked et al. |
| 2011/0061013 A1 | 3/2011 | Bilicki et al. |
| 2011/0074811 A1 | 3/2011 | Hanson et al. |
| 2011/0078055 A1 | 3/2011 | Faribault et al. |
| 2011/0078173 A1 | 3/2011 | Seligmann et al. |
| 2011/0117878 A1 | 5/2011 | Barash et al. |
| 2011/0119100 A1 | 5/2011 | Ruhl et al. |
| 2011/0137766 A1 | 6/2011 | Rasmussen et al. |
| 2011/0153384 A1 | 6/2011 | Horne et al. |
| 2011/0161096 A1 | 6/2011 | Buehler et al. |
| 2011/0167710 A1 | 7/2011 | Ramakrishnan et al. |
| 2011/0170799 A1 | 7/2011 | Carrino et al. |
| 2011/0173032 A1 | 7/2011 | Payne et al. |
| 2011/0173619 A1 | 7/2011 | Fish |
| 2011/0184813 A1 | 7/2011 | Barnes et al. |
| 2011/0208724 A1 | 8/2011 | Jones et al. |
| 2011/0218934 A1 | 9/2011 | Elser |
| 2011/0219450 A1 | 9/2011 | Mcdougal et al. |
| 2011/0225198 A1 | 9/2011 | Edwards et al. |
| 2011/0258158 A1 | 10/2011 | Resende et al. |
| 2011/0258242 A1 | 10/2011 | Eidson et al. |
| 2011/0270705 A1 | 11/2011 | Parker |
| 2011/0270812 A1 | 11/2011 | Ruby |
| 2011/0291851 A1 | 12/2011 | Whisenant |
| 2011/0310005 A1 | 12/2011 | Chen et al. |
| 2011/0314007 A1 | 12/2011 | Dassa et al. |
| 2012/0013684 A1 | 1/2012 | Robertson |
| 2012/0019559 A1 | 1/2012 | Siler et al. |
| 2012/0036013 A1 | 2/2012 | Neuhaus et al. |
| 2012/0036434 A1 | 2/2012 | Oberstein |
| 2012/0066296 A1 | 3/2012 | Appleton et al. |
| 2012/0079363 A1 | 3/2012 | Folting et al. |
| 2012/0106801 A1 | 5/2012 | Jackson |
| 2012/0131512 A1 | 5/2012 | Takeuchi et al. |
| 2012/0144335 A1 | 6/2012 | Abeln et al. |
| 2012/0150791 A1 | 6/2012 | Willson |
| 2012/0159307 A1* | 6/2012 | Chung et al. ............... 715/234 |
| 2012/0159362 A1 | 6/2012 | Brown et al. |
| 2012/0173985 A1 | 7/2012 | Peppel |
| 2012/0196557 A1 | 8/2012 | Reich et al. |
| 2012/0196558 A1 | 8/2012 | Reich et al. |
| 2012/0208636 A1 | 8/2012 | Feige |
| 2012/0221511 A1 | 8/2012 | Gibson et al. |
| 2012/0221580 A1 | 8/2012 | Barney |
| 2012/0245976 A1 | 9/2012 | Kumar et al. |
| 2012/0246148 A1 | 9/2012 | Dror |
| 2012/0254129 A1 | 10/2012 | Wheeler et al. |
| 2012/0290879 A1 | 11/2012 | Shibuya et al. |
| 2012/0323888 A1 | 12/2012 | Osann, Jr. |
| 2012/0330908 A1 | 12/2012 | Stowe et al. |
| 2012/0330973 A1 | 12/2012 | Ghuneim et al. |
| 2013/0006725 A1 | 1/2013 | Simanek et al. |
| 2013/0036346 A1 | 2/2013 | Cicerone |
| 2013/0046842 A1 | 2/2013 | Muntz et al. |
| 2013/0060786 A1 | 3/2013 | Serrano et al. |
| 2013/0061169 A1 | 3/2013 | Pearcy et al. |
| 2013/0073377 A1 | 3/2013 | Heath |
| 2013/0073454 A1 | 3/2013 | Busch |
| 2013/0078943 A1 | 3/2013 | Biage et al. |
| 2013/0097130 A1 | 4/2013 | Bingol et al. |
| 2013/0097482 A1 | 4/2013 | Marantz et al. |
| 2013/0111320 A1 | 5/2013 | Campbell et al. |
| 2013/0117651 A1 | 5/2013 | Waldman et al. |
| 2013/0101159 A1 | 6/2013 | Rosen |
| 2013/0150004 A1 | 6/2013 | Rosen |
| 2013/0151148 A1 | 6/2013 | Parundekar et al. |
| 2013/0176321 A1 | 7/2013 | Mitchell et al. |
| 2013/0179420 A1 | 7/2013 | Park et al. |
| 2013/0224696 A1 | 8/2013 | Wolfe et al. |
| 2013/0238616 A1 | 9/2013 | Rose et al. |
| 2013/0246170 A1 | 9/2013 | Gross et al. |
| 2013/0251233 A1 | 9/2013 | Yang et al. |
| 2013/0262527 A1 | 10/2013 | Hunter et al. |
| 2013/0263019 A1 | 10/2013 | Castellanos et al. |
| 2013/0268520 A1 | 10/2013 | Fisher et al. |
| 2013/0279757 A1 | 10/2013 | Kephart |
| 2013/0282696 A1 | 10/2013 | John et al. |
| 2013/0290011 A1 | 10/2013 | Lynn et al. |
| 2013/0290825 A1 | 10/2013 | Arndt et al. |
| 2013/0297619 A1 | 11/2013 | Chandarsekaran et al. |
| 2013/0318060 A1 | 11/2013 | Chang et al. |
| 2014/0019936 A1 | 1/2014 | Cohanoff |
| 2014/0032506 A1 | 1/2014 | Hoey et al. |
| 2014/0033010 A1 | 1/2014 | Richardt et al. |
| 2014/0040371 A1 | 2/2014 | Gurevich et al. |
| 2014/0047357 A1 | 2/2014 | Alfaro et al. |
| 2014/0059038 A1 | 2/2014 | McPherson et al. |
| 2014/0068487 A1 | 3/2014 | Steiger et al. |
| 2014/0095509 A1 | 4/2014 | Patton |
| 2014/0108068 A1 | 4/2014 | Williams |
| 2014/0108380 A1 | 4/2014 | Gotz et al. |
| 2014/0108985 A1 | 4/2014 | Scott et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0189536 A1 | 7/2014 | Lange et al. |
| 2014/0195515 A1 | 7/2014 | Baker et al. |
| 2014/0267294 A1 | 9/2014 | Ma |
| 2014/0267295 A1 | 9/2014 | Sharma |
| 2014/0279824 A1 | 9/2014 | Tamayo |
| 2014/0333651 A1 | 11/2014 | Cervelli et al. |
| 2014/0337772 A1 | 11/2014 | Cervelli et al. |
| 2015/0046870 A1 | 2/2015 | Goldenberg et al. |

FOREIGN PATENT DOCUMENTS

| | | |
|---|---|---|
| EP | 2551799 | 1/2013 |
| EP | 2555126 | 2/2013 |
| EP | 2778977 | 9/2014 |
| EP | 2835745 | 2/2015 |
| EP | 2835770 | 2/2015 |
| EP | 2838039 | 2/2015 |
| GB | 2516155 | 1/2015 |
| NL | 2013306 | 2/2015 |
| WO | WO 00/09529 | 2/2000 |
| WO | WO 2005/104736 | 11/2005 |
| WO | 2009/051987 | 4/2009 |
| WO | WO 2009/061501 | 5/2009 |
| WO | WO 2010/000014 | 1/2010 |
| WO | 2010/030913 | 3/2010 |

(56) References Cited

FOREIGN PATENT DOCUMENTS

| WO | 2010/030919 | 3/2010 |
|---|---|---|
| WO | WO 2013/0102892 | 7/2013 |

OTHER PUBLICATIONS

Nierman, Evaluating Structural Simiilarity in XML Documents, 2002, 6 pages.*
Baker et al., "Megastore: Providing Scalable, Highly Available Storage for Interactive Services," 5th Biennial Conference on Innovative Data Systems Research (CIDR '11), Jan. 9-12, 2011, Asilomar, California, pp. 223-234.
Bernstein et al., "Hyder—A Transactional Record Manager for Shared Flash," 5th Biennial Conference on Innovative Data Systems Research (CIDR '11), Jan. 9-12, 2011, Asilomar, California, pp. 9-20.
Chang et al., "Bigtable: A Distributed Storage System for Structured Data", Google, Inc., OSDI '06: Seventh Symposium on Operating System Design and Implementation, Seattle, WA, Nov. 2006 (14 pages).
Klemmer et al., "Where Do Web Sites Come From? Capturing and Interacting with Design History," Association for Computing Machinery, CHI 2002, Apr. 20-25, 2002, Minneapolis, MN (8 pages).
Kokossi et al., "D7-Dynamic Ontoloty Management System (Design)," Information Societies Technology (IST) Programme, Jan. 10, 2002, pp. 1-27.
Miklau et al., "Securing History: Privacy and Accountability in Database Systems," 3rd Biennial Conference on Innovative Data Systems Research (CIDR), Jan. 7-10, 2007, Asilomar, California, pp. 387-396.
Niepert et al., "A Dynamic Ontology for a Dynamic Reference Work", JCDL' 07, Joint Conference on Digital Libraries, Jun. 17-22, 2007, Vancouver, British Columbia, Canada (10 pages).
Peng et al., "Large-scale Incremental Processing Using Distributed Transactions and Notifications" Proceedings of the 9th USENIX Symposium on Operating Systems Design and Implementation, USENIX, 2010, pp. 1-14.
Thomson et al., "The Case for Determinism in Database Systems," The 36th International Conference on Very Large Data Bases, Sep. 13-17, 2010, Singapore, Proceedings of the VLDB Endowment, vol. 3, No. 1 (11 pages).
Anonymous, "A Real-World Problem of Matching Records," Nov. 2006, <http://grupoweb.upf.es/bd-web/slides/ullman.pdf> (16 pages).
Anonymous, "BackTult—JD Edwards One World Version Control System," printed Jul. 23, 2007 (1 page).
Lim et al., "Resolving Attribute Incompatibility in Database Integration: An Evidential Reasoning Approach," Department of Computer Science, University of Minnesota, <http://reference.kfupm.edu.sa/content/r/e/resolving_attribute_incompatibility_in_d_531691.pdf>, pp. 154-163.
Litwin et al., "Multidatabase Interoperability," IEEE Computer, Dec. 1986, vol. 19, No. 12, pp. 10-18. <http://www.lamsade.dauphine.fr/~litwin/mdb-interoperability.pdf>.
Qiang et al., "A Mutual-Information-Based Approach to Entity Reconciliation in Heterogeneous Databases," Proceedings of 2008 International Conference on Computer Science & Software Engineering, IEEE Computer Society, New York, NY, Dec. 12-14, 2008, pp. 666-669.
Zhao et al., "Entity Matching Across Heterogeneous Data Sources: An Approach Based on Constrained Cascade Generalization," Data & Knowledge Engineering, vol. 66, No. 3, Sep. 2008, pp. 368-381.
"A First Look: Predicting Market Demand for Food Retail using a Huff Analysis," TRF Policy Solutions, Jul. 2012 (30 pages).
Acklen, Laura, "Absolute Beginners Guide to Microsoft Word 2003," Dec. 24, 2003, pp. 15-18, 34-41, 308-316.
Ananiev et al., "The New Modality API," http://web.archive.org/web/20061211011958/http://java.sun.com/developer/technicalArticles/J2SE/Desktop/javase6/modality/, Jan. 2006 (8 pages).
Bugzilla@Mozilla, "Bug 18726—[feature] Long-click means of invoking contextual menus not supported," http://bugzilla.mozilla.org/show_bug.cgi?id=18726, accessed online on Jun. 13, 2013, (11 pages).
Chen et al., "Bringing Order to the Web: Automatically Categorizing Search Results," CHI '00, Proceedings of the SIGCHI conference on Human Factors in Computing Systems, 2000 (9 pages).
Dramowicz, Ela, "Retail Trade Area Analysis Using the Huff Model," Directions Magazine, Jul. 2, 2005, http://www.directionsmag.com/articles/retail-trade-area-analysis-using-the-huff-mode1/123411, accessed online on Dec. 4, 2013 (10 pages).
GIS-NET 3 Public—Department of Regional Planning. Planning & Zoning Information for Unincorporated LA County. Retrieved Oct. 2, 2013 from http://gis.planning.lacounty.gov/GIS-NET3_Public/Viewer.html (2 pages).
Griffith, Daniel A., "A Generalized Huff Model," Geographical Analysis, Apr. 1982, vol. 14, No. 2, pp. 135-144.
Hibbert et al., "Prediction of Shopping Behavior Using a Huff Model Within a GIS Framework," Healthy Eating in Context, Mar. 18, 2011 (16 pages).
Huff et al., "Calibrating the Huff Model Using ArcGIS Business Analyst," ESRI, Sep. 2008 (33 pages).
Huff, David L., "Parameter Estimation in the Huff Model," ESRI, ArcUser, Oct.-Dec. 2003, pp. 34-36.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14 (8 pages).
Manske, "File Saving Dialogs," <http://www.mozilla.org/editor/ui_specs/FileSaveDialogs.html>, Jan. 20, 1999 (7 pages).
Map of San Jose, CA. Retrieved Oct. 2, 2013 from http://maps.google.com (1 page).
Map of San Jose, CA. Retrieved Oct. 2, 2013 from http://maps.bing.com (1 page).
Map of San Jose, CA. Retrieved Oct. 2, 2013 from http://maps.yahoo.com (1 page).
Microsoft Office—Visio, "About connecting shapes," <http://office.microsoft.com/en-us/visio-help/about-connecting-shapes-HP085050369.aspx>, accessed online on Aug. 4, 2011 (6 pages).
Microsoft Office—Visio, "Add and glue connectors with the Connector tool," <http://office.microsoft.com/en-us/visio-help/add-and-glue-connectors-with-the-connector-tool-HA010048532.aspx?CTT=1>, accessed online on Aug. 4, 2011 (1 page).
"A Quick Guide to UniProtKB Swiss-Prot & TrEMBL," Sep. 2011, pp. 2.
Antoshenkov, Gennady, "Dictionary-Based Order-Preserving String Compression," the VLDB Journal, 1997, vol. 6, pp. 26-39.
"Apache HBase," <http://hbase.apache.org/> printed Sep. 14, 2011 in 1 page.
Bluttman et al., "Excel Formulas and Functions for Dummies," 2005, Wiley Publishing, Inc., pp. 280, 284-286.
Canese et al., "Chapter 2: PubMed: The Bibliographic Database," The NCBI Handbook, Oct. 2002, pp. 1-10.
Conner, Nancy, "Google Apps: The Missing Manual," May 1, 2008, pp. 15.
Delcher et al., "Identifying Bacterial Genes and Endosymbiont DNA with Glimmer," BioInformatics, vol. 23, No. 6, 2007, pp. 673-679.
Devanbu et al., "Authentic Third-party Data Publication," 2000, pp. 19, http://www.cs.ucdavis.edu/~devanbu/authdbpub.pdf.
Dreyer et al., "An Object-Oriented Data Model for a Time Series Management System," Proceedings of the 7th International Working Conference on Scientific and Statistical Database Management, Charlottesville, Virginia USA, Sep. 28-30, 1994, pp. 12.
Elmasri et al., "Fundamentals of Database Systems," 2004, Fourth Edition, pp. 455-491.
Goswami, Gautam, "Quite Writly Said!," One Brick at a Time, Aug. 21, 2005, pp. 7.
Hansen et al. "Analyzing Social Media Networks with NodeXL: Insights from a Connected World", Chapter 4, pp. 53-67 and Chapter 10, pp. 143-164, published Sep. 2010.
Kahan et al., "Annotea: an open RDF infrastructure for shared WEB annotations", Computer Networks 39, pp. 589-608, 2002.

(56) References Cited

OTHER PUBLICATIONS

Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.

Keylines.com, "KeyLines Datasheet," Mar. 2014, <http://keylines.com/wp-content/uploads/2014/03/KeyLines-datasheet.pdf> downloaded May 12, 2014 in 2 pages.

Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10 pages.

Kitts, Paul, "Chapter 14: Genome Assembly and Annotation Process," The NCBI Handbook, Oct. 2002, pp. 1-21.

Madden, Tom, "Chapter 16: The BLAST Sequence Analysis Tool," The NCBI Handbook, Oct. 2002, pp. 1-15.

Manno et al., "Introducing Collaboration in Single-user Applications through the Centralized Control Architecture," 2010, pp. 10.

Mentzas et al. "An Architecture for Intelligent Assistance in the Forecasting Process," Proceedings of the Twenty-Eighth Hawaii International Conference on System Sciences, Jan. 3-6, 1995, vol. 3, pp. 167-176.

Microsoft—Developer Network, "Getting Started with VBA in Word 2010," Apr. 2010, <http://msdn.microsoft.com/en-us/library/ff604039%28v=office.14%29.aspx> as printed Apr. 4, 2014 in 17 pages.

Mizrachi, Ilene, "Chapter 1: GenBank: The Nuckeotide Sequence Database," The NCBI Handbook, Oct. 2002, pp. 1-14.

Palmas et al., "An Edge-Bunding Layout for Interactive Parallel Coordinates" 2014 IEEE Pacific Visualization Symposium, pp. 57-64.

Rouse, Margaret, "OLAP Cube," <http://searchdatamanagement.techtarget.com/definition/OLAP-cube>, Apr. 28, 2012, pp. 16.

Sigrist, et al., "PROSITE, a Protein Domain Database for Functional Characterization and Annotation," Nucleic Acids Research, 2010, vol. 38, pp. D161-D166.

Sirotkin et al., "Chapter 13: The Processing of Biological Sequence Data at NCBI," The NCBI Handbook, Oct. 2002, pp. 1-11.

"The Apache Cassandra Project," <http://cassandra.apache.org/> printed Sep. 14, 2011 in 3 pages.

"The FASTA Program Package," fasta-36.3.4, Mar. 25, 2011, pp. 29.

Wollrath et al., "A Distributed Object Model for the Java System," Conference on Object-Oriented Technologies and Systems, Jun. 17-21, 1996, pp. 219-231.

Issue Notification for U.S. Appl. No. 13/917,571 dated Aug. 5, 2014.

Notice of Allowance for U.S. Appl. No. 14/102,394 dated Aug. 25, 2014.

Notice of Allowance for U.S. Appl. No. 14/108,187 dated Aug. 29, 2014.

Notice of Allowance for U.S. Appl. No. 14/135,289 dated Oct. 14, 2014.

Official Communication for New Zealand Patent Application No. 624557 dated May 14, 2014.

Official Communication for New Zealand Patent Application No. 628585 dated Aug. 26, 2014.

Official Communication for European Patent Application No. 14158861.6 dated Jun. 16, 2014.

Official Communication for New Zealand Patent Application No. 622517 dated Apr. 3, 2014.

Official Communication for Great Britain Patent Application No. 1404457.2 dated Aug. 14, 2014.

Official Communication for New Zealand Patent Application No. 627962 dated Aug. 5, 2014.

Official Communication for European Patent Application No. 14159464.8 dated Jul. 31, 2014.

Official Communication for European Patent Application No. 14159464.8 dated Aug. 20, 2014.

Official Communication for European Patent Application No. 14159464.8 dated Sep. 22, 2014.

Official Communication for New Zealand Patent Application No. 628840 dated Aug. 28, 2014.

Official Communication in New Zealand Application No. 628495 dated Aug. 19, 2014.

Official Communication for United Kingdom Patent Application No. 1408025.3 dated Nov. 6, 2014.

Official Communication for U.S. Appl. No. 14/289,596 dated Jul. 18, 2014.

Official Communication for U.S. Appl. No. 14/289,599 dated Jul. 22, 2014.

Official Communication for U.S. Appl. No. 14/225,160 dated Jul. 29, 2014.

Official Communication for U.S. Appl. No. 14/268,964 dated Sep. 3, 2014.

Official Communication for U.S. Appl. No. 14/225,084 dated Sep. 2, 2014.

Official Communication for U.S. Appl. No. 14/294,098 dated Aug. 15, 2014.

Official Communication for U.S. Appl. No. 14/148,568 dated Oct. 22, 2014.

Official Communication for U.S. Appl. No. 14/225,006 dated Sep. 10, 2014.

Official Communication for U.S. Appl. No. 14/294,098 dated Nov. 6, 2014.

Official Communication for U.S. Appl. No. 14/306,138 dated Sep. 23, 2014.

Official Communication for U.S. Appl. No. 14/306,154 dated Sep. 9, 2014.

Official Communication for U.S. Appl. No. 14/306,147 dated Sep. 9, 2014.

Chung, Chin-Wan, "Dataplex: An Access to Heterogeneous Distributed Databases," Communications of the ACM, Association for Computing Machinery, Inc., vol. 33, No. 1, Jan. 1, 1990, pp. 70-80.

Olanoff, Drew, "Deep Dive with the New Google Maps for Desktop with Google Earth Integration, It's More than Just a Utility," May 15, 2013, pp. 1-6, retrieved from the internet: http://web.archive.org/web/20130515230641/http://techcrunch.com/2013/05/15/deep-dive-with-the-new-google-maps-for-desktop-with-google-earth-integration-its-more-than-just-a-utility/.

Wikipedia, "Federated Database System," Sep. 7, 2013, http://en.wikipedia.org/w/index.php?title=Federated database system &oldid=571954221,.retrieved from the internet on Jan. 27, 2015.

Official Communication for Great Britain Patent Application No. 1404574.4 dated Dec. 18, 2014.

Official Communication for Great Britain Patent Application No. 1411984.6 dated Dec. 22, 2014.

Official Communication for Great Britain Application 1413935.6 dated Jan. 27, 2015.

Official Communication for European Patent Application No. 14180281.9 Jan. 26, 2015.

Official Communication for European Patent Application No. 14187996.5 dated Feb. 12, 2015.

Official Communication for European Patent Application No. 14180142.3 dated Feb. 6, 2015.

Official Communication for European Patent Application No. 14186225.0 dated Feb. 13, 2015.

Official Communication for European Patent Application No. 14189344.6 dated Feb. 20, 2015.

Definition "Identify" downloaded Jan. 22, 2015, 1 page.

Definition "Overlay" downloaded Jan. 22, 2015, 1 page.

Hardesty, "Privacy Challenges: Analysis: It's Surprisingly Easy to Identify Individuals from Credit-Card Metadata," MIT News on Campus and Around the World, MIT News Office, Jan. 29, 2015, 3 pages.

Official Communication for U.S. Appl. No. 14/289,596 dated Jan. 26, 2015.

Official Communication for U.S. Appl. No. 14/319,765 dated Feb. 4, 2015.

Official Communication for U.S. Appl. No. 14/225,160 dated Feb. 11, 2015.

Official Communication for U.S. Appl. No. 14/306,138 dated Feb. 18, 2015.

Official Communication for U.S. Appl. No. 14/306,147 dated Feb. 19, 2015.

(56) References Cited

OTHER PUBLICATIONS

Official Communication for U.S. Appl. No. 14/225,084 dated Feb. 20, 2015.
Official Communication for U.S. Appl. No. 14/225,006 dated Feb. 27, 2015.
Official Communication for U.S. Appl. No. 14/473,552 dated Feb. 24, 2015.
Official Communication for U.S. Appl. No. 14/504,103 dated Feb. 5, 2015.
Official Communication for U.S. Appl. No. 14/294,098 dated Dec. 29, 2014.
Official Communication for U.S. Appl. No. 14/473,860 dated Jan. 5, 2015.

\* cited by examiner

```html
<html>
    <head>
        <title>Titanic (1997 film)</title>
    </head>
    <body bgcolor=white>
        <br> Titanic is a 1997 American epic romantic disaster film providing a fictionalized account of the sinking of the RMS Titanic and starring Leonardo DiCaprio and Kate Winslet as members of different social classes who fall in love aboard the ship during its ill-fated maiden voyage. </br>
        <table border="1" style="margin: 0px auto;">
            <tr>
                <th scope="row">Director</th>
                <td><a href="http://en.wikipedia.org/wiki/James_Cameron" title="James Cameron">James Cameron</a></td>
            </tr>
            <tr>
                <th scope="row">Starring</th>
                <td>
                    <div class="plainlist" style="margin-left: 0em;">
                        <ul>
                            <li><a href="http://en.wikipedia.org/wiki/Leonardo_DiCaprio" title="Leonardo DiCaprio">Leonardo DiCaprio</a></li>
                            <li><a href="http://en.wikipedia.org/wiki/Kate_Winslet" title="Kate Winslet">Kate Winslet</a></li>
                            <li><a href="http://en.wikipedia.org/wiki/Billy_Zane" title="Billy Zane">Billy Zane</a></li>
                            <li>Kathy Bates</li>
                            <li>Frances Fisher</li>
                        </ul>
                    </div>
                </td>
            </tr>
        </table>
    </body>
</html>
```

310a — `<li><a href="http://en.wikipedia.org/wiki/Leonardo_DiCaprio" ...>`
310b — `<li><a href="http://en.wikipedia.org/wiki/Kate_Winslet" ...>`
310c — `<li><a href="http://en.wikipedia.org/wiki/Billy_Zane" ...>`
310d — `<li>Kathy Bates</li>`
310e — `<li>Frances Fisher</li>`

Titanic (1997 film)

Titanic is a 1997 American epic romantic disaster film providing a fictionalized account of the sinking of the RMS Titanic and starring Leonardo DiCaprio and Kate Winslet as members of different social classes who fall in love aboard the ship during its ill-fated maiden voyage.

| Director | James Cameron |
|---|---|
| Starring | • Leonardo DiCaprio — 310a<br>• Kate Winslet — 310b<br>• Billy Zane — 310c<br>• Kathy Bates — 310d<br>• Francis Fisher — 310e |

| Titanic (1997 film) | | _ ☐ X |
|---|---|---|
| Titanic is a 1997 American epic romantic disaster film providing a fictionalized account of the sinking of the RMS Titanic and starring Leonardo DiCaprio and Kate Winslet as members of different social classes who fall in love aboard the ship during its ill-fated maiden voyage. | | |
| Director | James Cameron | |
| Starring | • Leonardo DiCaprio ◄<br>• Kate Winslet ◄<br>• Billy Zane ◄<br>• Kathy Bates ◄<br>• Francis Fisher ◄ | 310a<br>310b<br>310c<br>310d<br>310e |
| | | 300 |

FIG. 6A

| Titanic (1997 film) | | _ ☐ X |
|---|---|---|
| Titanic is a 1997 American epic romantic disaster film providing a fictionalized account of the sinking of the RMS Titanic and starring Leonardo DiCaprio and Kate Winslet as members of different social classes who fall in love aboard the ship during its ill-fated maiden voyage. | | |
| Director | James Cameron | |
| Starring | • Leonardo DiCaprio ◄<br>• Kate Winslet ◄<br>• Billy Zane ◄<br>• Kathy Bates ◄<br>• Francis Fisher ◄ | 310a<br>310b<br>310c<br>310d<br>310e |
| | | 300 |

FIG. 6B

| Titanic (1997 film) | | | _ ▢ X |
|---|---|---|---|
| Titanic is a 1997 American epic romantic disaster film providing a fictionalized account of the sinking of the RMS Titanic and starring Leonardo DiCaprio and Kate Winslet as members of different social classes who fall in love aboard the ship during its ill-fated maiden voyage. | | | |
| | Director | James Cameron | |
| | Starring | • Leonardo DiCaprio ◄<br>• Kate Winslet ◄<br>• Billy Zane ◄<br>• Kathy Bates ◄<br>• Francis Fisher ◄ | — 310a<br>— 310b<br>— 310c<br>— 310d<br>— 310e |
| | | | 300 |

FIG. 7A

| Titanic (1997 film) | | | _ ▢ X |
|---|---|---|---|
| Titanic is a 1997 American epic romantic disaster film providing a fictionalized account of the sinking of the RMS Titanic and starring Leonardo DiCaprio and Kate Winslet as members of different social classes who fall in love aboard the ship during its ill-fated maiden voyage. | | | |
| | Director | James Cameron | |
| | Starring | • Leonardo DiCaprio ◄<br>• Kate Winslet ◄<br>• Billy Zane ◄<br>• Kathy Bates ◄<br>• Francis Fisher ◄ | — 310a<br>— 310b<br>— 310c<br>— 310d<br>— 310e |
| | | | 300 |

FIG. 7B

```
<html>
    <head>
        <title>As good as it gets</title>
    </head>
    <body bgcolor=white>
        <br> As Good as It Gets is a 1997 American romantic comedy film starring Jack Nicholson as an obsessive-compulsive novelist, and Helen Hunt as a single mother with an asthmatic son. </br>
        <table border="1" style="margin: 0px auto;">
            <tr>
                <th scope="row">Director</th>
                <td><a href="http://en.wikipedia.org/wiki/James_L._Brooks" title="James Cameron">James L. Brooks</a></td>
            </tr>
            <tr>
                <th scope="row">Starring</th>
                <td>
                    <div class="plainlist" style="margin-left: 0em;">
                        <ul>
                            <li><a href="http://en.wikipedia.org/wiki/Jack_Nicholson" title="Jack Nicholson">Jack Nicholson</a></li>          ← 810a
                            <li><a href="http://en.wikipedia.org/wiki/Helen_Hunt" title="Helen Hunt">Helen Hunt</a></li>          ← 810b
                        </ul>
                    </div>
                </td>
            </tr>
        </table>
    </body>
</html>
                                                                                                                800
```

FIG. 8A

| As Good As It Gets | | – ☐ X |
|---|---|---|
| As Good as It Gets is a 1997 American romantic comedy film starring Jack Nicholson as an obsessive-compulsive novelist, and Helen Hunt as a single mother with an asthmatic son. | | |
| Director | James L. Brooks | |
| Starring | • Jack Nicholson  ← 810a<br>• Helen Hunt  ← 810b | |
| | | 800 |

FIG. 8B

| As Good As It Gets | | – ☐ X |
|---|---|---|
| As Good as It Gets is a 1997 American romantic comedy film starring Jack Nicholson as an obsessive-compulsive novelist, and Helen Hunt as a single mother with an asthmatic son. | | |
| Director | James L. Brooks | |
| Starring | • Jack Nicholson  ← 810a<br>• Helen Hunt  ← 810b | |
| | | 800 |

FIG. 8C

```
<html>
    <head>
        <title>The Big Lebowski</title>
    </head>
    <body bgcolor=white>
        <br> The Big Lebowski is a 1998 comedy film written and directed by Joel and
Ethan Coen. Jeff Bridges stars as Jeff Lebowski, an unemployed Los Angeles slacker nicknamed
"The Dude."
        </br>
        <table border="1" style="margin: 0px auto;">
            <tr>
                <th scope="row">Written by</th>
                <td>Ethan_Coen, Joel_Coen</td>
            </tr>
            <tr>
                <th scope="row">Starring</th>
                <td>
                    <div class="plainlist" style="margin-left: 0em;">
                        <ul>
                            <li><a href="http://en.wikipedia.org/wiki/Jeff_Bridges" title="Jeff Bridges">Jeff Bridges</a></li>
                            <li><a href="http://en.wikipedia.org/wiki/John_Goodman" title="John Goodman">John Goodman</a></li>
                            <li>Julianne Moore</li>
                            <li><a href="http://en.wikipedia.org/wiki/Steve_Buscemi" title="Steve Buscemi">Steve Buscemi</a></li>
                        </ul>
                    </div>
                </td>
            </tr>
        </table>
    </body>
</html>
```

FIG. 9A

The Big Lebowski

The Big Lebowski is a 1998 comedy film written and directed by Joel and Ethan Coen. Jeff Bridges stars as Jeff Lebowski, an unemployed Los Angeles slacker nicknamed "The Dude."

| Written by | Ethan Coen, Joel Coen |
|---|---|
| Starring | • Jeff Bridges<br>• John Goodman<br>• Julianne Moore<br>• Steve Buscemi |

FIG. 9B

SYSTEMS AND METHODS FOR VISUAL DEFINITION OF DATA ASSOCIATIONS

CROSS REFERENCE TO RELATED APPLICATIONS

This application claims priority to U.S. Provisional Patent Application No. 61/923,536, which was filed on Jan. 3, 2014, and the disclosure of which is expressly incorporated herein by reference in its entirety.

BACKGROUND

The Internet is a vast source of information. Some of the information can be very useful to researchers, scientists, or other professionals, who would like to be able to collect the relevant data and process it. Unfortunately, this task is made difficult by the fact that the information is spread over trillions of webpages and is presented on those webpages in different formats. Moreover, even if one can select the particular webpages containing the relevant information and download all the information from those webpages, the downloaded information is likely to contain a lot of information that is irrelevant for the particular project.

BRIEF DESCRIPTION OF THE DRAWINGS

Reference will now be made to the accompanying drawings, which illustrate exemplary embodiments of the present disclosure. In the drawings:

FIG. 3A is an HTML code of an exemplary webpage, consistent with embodiments of the present disclosure;

FIG. 3B illustrates the webpage of FIG. 3A as rendered by a web browser, consistent with embodiments of the present disclosure;

FIGS. 6A and 6B illustrate exemplary webpages with highlighted HTML objects, consistent with embodiments of the present disclosure;

FIGS. 7A and 7B illustrate exemplary webpages with highlighted HTML objects, consistent with embodiments of the present disclosure;

FIG. 8A is an HTML code of an exemplary webpage, consistent with embodiments of the present disclosure;

FIG. 8B illustrates the exemplary webpage of FIG. 8A as rendered by a web browser, consistent with embodiments of the present disclosure;

FIG. 8C illustrates the exemplary webpage of FIG. 8B with highlighted HTML objects, consistent with embodiments of the present disclosure;

FIGS. 9A and 9B illustrate HTML code of an exemplary webpage and the rendered exemplary webpage, consistent with embodiments of the present disclosure;

DESCRIPTION OF EXEMPLARY EMBODIMENTS

Reference will now be made in detail to several exemplary embodiments of the present disclosure, including those illustrated in the accompanying drawings. Whenever possible, the same reference numbers will be used throughout the drawings to refer to the same or like parts.

According to some embodiments, the operations, techniques, and/or components described herein can be implemented by an electronic device, which can include one or more special-purpose computing devices. The special-purpose computing devices can be hard-wired to perform the operations, techniques, and/or components described herein, or can include digital electronic devices such as one or more application-specific integrated circuits (ASICs) or field programmable gate arrays (FPGAs) that are persistently programmed to perform the operations, techniques and/or components described herein, or can include one or more general purpose hardware processors programmed to perform such features of the present disclosure pursuant to program instructions in firmware, memory, other storage, or a combination. Such special-purpose computing devices can also combine custom hard-wired logic, ASICs, or FPGAs with custom programming to accomplish the technique and other features of the present disclosure. The special-purpose computing devices can be desktop computer systems, portable computer systems, handheld devices, networking devices, or any other device that incorporates hard-wired and/or program logic to implement the techniques and other features of the present disclosure.

The one or more special-purpose computing devices can be generally controlled and coordinated by operating system software, such as iOS, Android, Blackberry, Chrome OS, Windows XP, Windows Vista, Windows 7, Windows 8, Windows Server, Windows CE, Unix, Linux, SunOS, Solaris, VxWorks, or other compatible operating systems. In other embodiments, the computing device can be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 1:
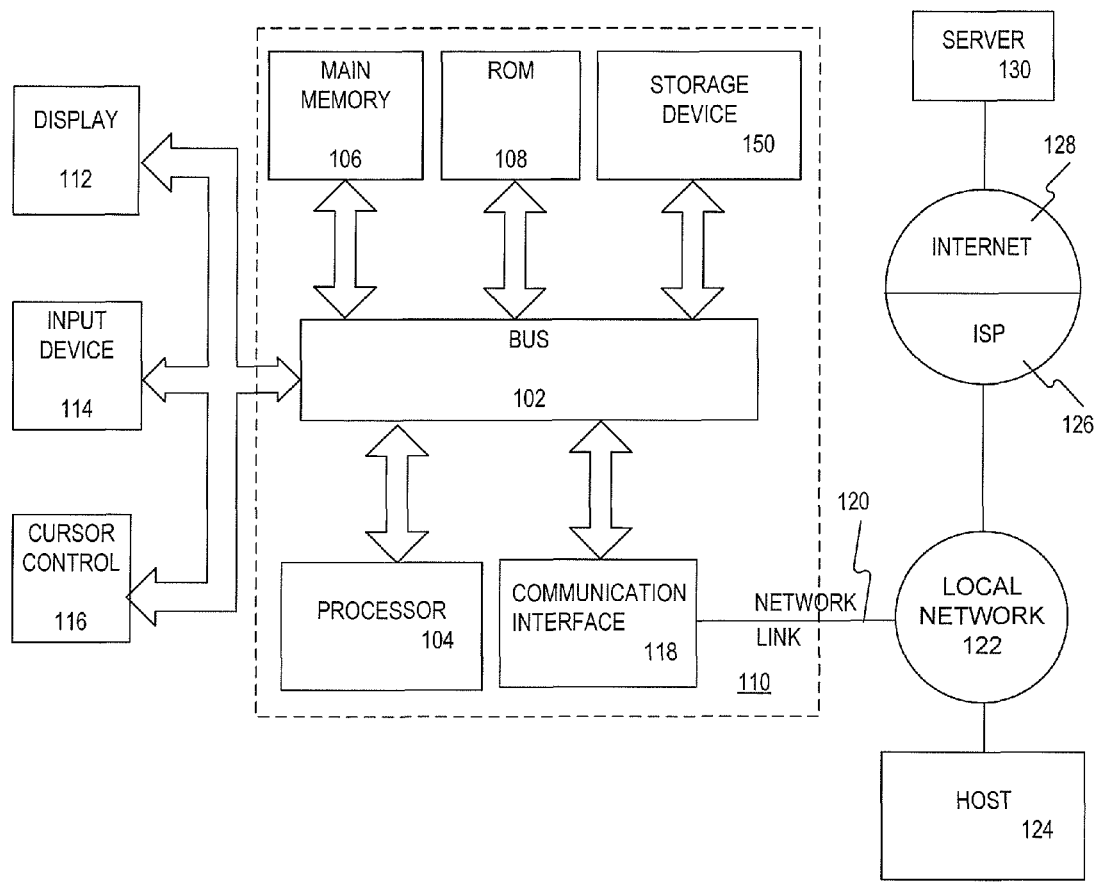
FIG. 1 is a block diagram of an exemplary electronic device, consistent with embodiments of the present disclosure.

By way of example, FIG. 1 is a block diagram that illustrates an implementation of an electronic device 110, which, as described above, can comprise one or more electronic devices. Electronic device 110 includes a bus 102 or other communication mechanism for communicating information, and one or more hardware processors 104, coupled with bus 102 for processing information. One or more hardware processors 104 can be, for example, one or more general purpose microprocessors.

Electronic device 110 also includes a main memory 106, such as a random access memory (RAM) or other dynamic storage device, coupled to bus 102 for storing information and instructions to be executed by processor 104. Main memory 106 also can be used for storing temporary variables or other intermediate information during execution of instructions to be executed by processor 104. Such instructions, when stored in non-transitory storage media accessible to one or more processors 104, render electronic device 110 into a special-purpose machine that is customized to perform the operations specified in the instructions.

Electronic device 110 further includes a read only memory (ROM) 108 or other static storage device coupled to bus 102 for storing static information and instructions for processor 104. A storage device 150, such as a magnetic disk, optical disk, or USB thumb drive (Flash drive), etc., is provided and coupled to bus 102 for storing information and instructions.

Electronic device 110 can be coupled via bus 102 to a display 112, such as a cathode ray tube (CRT), an LCD display, or a touchscreen, for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. The input device typically has two degrees of freedom in two axes, a first axis (for example, x) and a second axis (for example, y), that allows the device to specify positions in a plane. In some embodiments, the same direction information and command selections as cursor control may be implemented via receiving touches on a touch screen without a cursor.

Electronic device 110 can include a user interface module to implement a GUI that may be stored in a mass storage device as executable software codes that are executed by the one or more computing devices. This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C, and C++. A software module can be compiled and linked into an executable program, installed in a dynamic link library, or written in an interpreted programming language such as, for example, BASIC, Perl, Python, or Pig. It will be appreciated that software modules can be callable from other modules or from themselves, and/or can be invoked in response to detected events or interrupts. Software modules configured for execution on computing devices can be provided on a computer readable medium, such as a compact disc, digital video disc, flash drive, magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in firmware, such as an EPROM. It will be further appreciated that hardware modules can be comprised of connected logic units, such as gates and flip-flops, and/or can be comprised of programmable units, such as programmable gate arrays or processors. The modules or computing device functionality described herein are preferably implemented as software modules, but can be represented in hardware or firmware. Generally, the modules described herein refer to logical modules that may be combined with other modules or divided into sub-modules despite their physical organization or storage.

Electronic device 110 can implement the techniques and other features described herein using customized hard-wired logic, one or more ASICs or FPGAs, firmware and/or program logic which in combination with the electronic device causes or programs electronic device 110 to be a special-purpose machine. According to some embodiments, the techniques and other features described herein are performed by electronic device 110 in response to one or more processors 104 executing one or more sequences of one or more instructions contained in main memory 106. Such instructions can be read into main memory 106 from another storage medium, such as storage device 150. Execution of the sequences of instructions contained in main memory 106 causes processor 104 to perform the process steps described herein. In alternative embodiments, hard-wired circuitry can be used in place of or in combination with software instructions.

The term "non-transitory media" as used herein refers to any media storing data and/or instructions that cause a machine to operate in a specific fashion. Such non-transitory media can comprise non-volatile media and/or volatile media. Non-volatile media includes, for example, optical or magnetic disks, such as storage device 150. Volatile media includes dynamic memory, such as main memory 106. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from, but can be used in conjunction with, transmission media. Transmission media participates in transferring information between storage media. For example, transmission media includes coaxial cables, copper wire and fiber optics, including the wires that comprise bus 102. Transmission media can also take the form of acoustic or light waves, such as those generated during radio-wave and infra-red data communications.

Various forms of media can be involved in carrying one or more sequences of one or more instructions to processor 104 for execution. For example, the instructions can initially be carried on a magnetic disk or solid state drive of a remote computer. The remote computer can load the instructions into its dynamic memory and send the instructions over a telephone line using a modem. A modem local to electronic device 110 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 can optionally be stored on storage device 150 either before or after execution by processor 104.

Electronic device 110 also includes a communication interface 118 coupled to bus 102. Communication interface 118 provides a two-way data communication coupling to a network link 120 that is connected to a local network 122. For example, communication interface 118 can be an integrated services digital network (ISDN) card, cable modem, satellite modem, or a modem to provide a data communication connection to a corresponding type of telephone line. As another example, communication interface 118 can be a local area network (LAN) card to provide a data communication connection to a compatible LAN. Wireless links can also be implemented. In any such implementation, communication interface 118 sends and receives electrical, electromagnetic or optical signals that carry digital data streams representing various types of information.

Network link 120 typically provides data communication through one or more networks to other data devices. For example, network link 120 can provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from electronic device 110, are example forms of transmission media.

Electronic device 110 can send messages and receive data, including program code, through the network(s), network link 120 and communication interface 118. In the Internet example, a server 130 might transmit a requested code for an application program through Internet 128, ISP 126, local network 122 and communication interface 118.

The received code can be executed by processor 104 as it is received, and/or stored in storage device 150, or other non-volatile storage for later execution.

Figure 2:
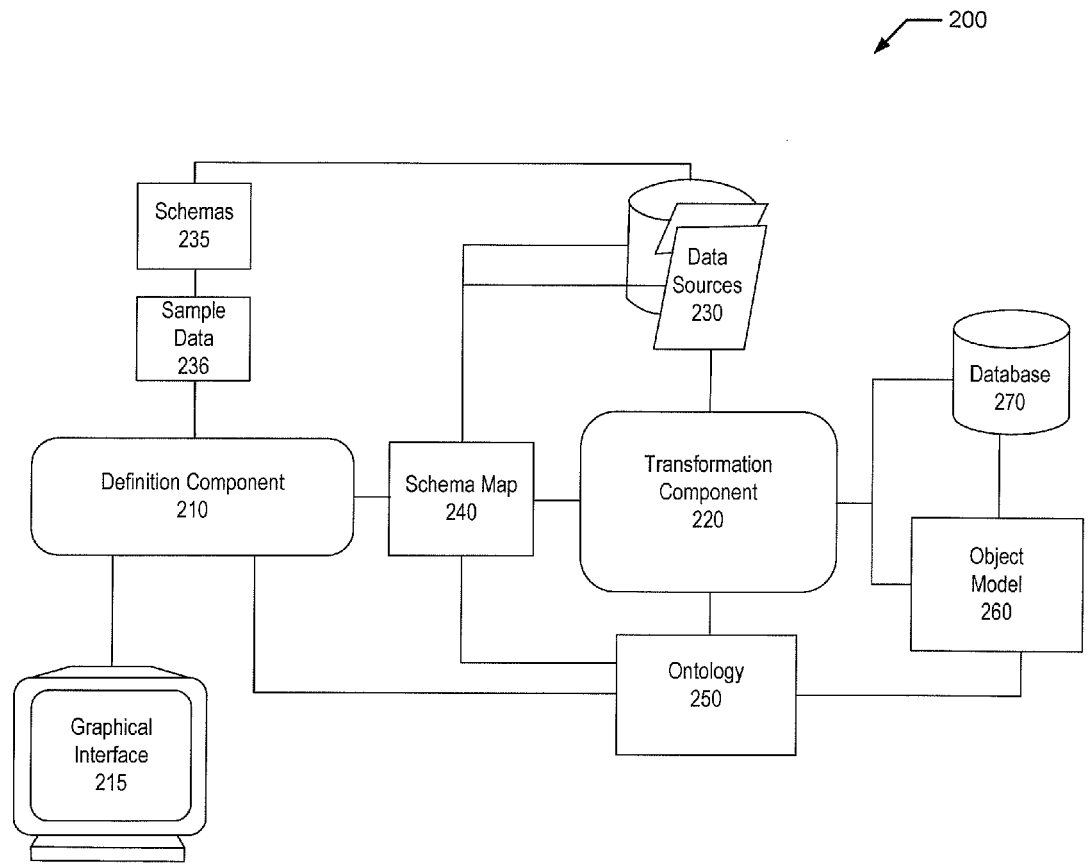
FIG. 2 is a block diagram of an exemplary data fusion system, consistent with embodiments of the present disclosure.

FIG. 2 shows, in block diagram form, an exemplary data fusion system 200, consistent with embodiments of the present disclosure. In some embodiments, data fusion system 200 can be a part of or communicatively coupled to electronic device 110. Among other things, system 200 can facilitate transformation of one or more data sources, such as data sources 230, into an object model 260, whose semantics are defined by an ontology 250. The transformation can be performed for a variety of reasons. For example, a database administrator can wish to import data from data sources 230 into a database 270 for persistently storing object model 260. As another example, a data presentation component (not depicted) can transform input data from data sources 230 "on the fly" into object model 260. Object model 260 can then be utilized, in conjunction with ontology 250, for analysis through graphs and/or other data visualization techniques.

System 200 comprises a definition component 210 and a translation component 220, both implemented by one or more processors on one or more computing devices executing hardware and/or software-based logic for providing various functionality described herein. As will be appreciated from the present disclosure, system 200 can comprise fewer or additional components that provide various functionalities described herein. Such components are, for clarity, omitted from FIG. 2. Moreover, the component(s) of system 200 responsible for providing various functionalities can further vary from embodiment to embodiment.

Definition component 210 generates and/or modifies ontology 250 and a schema map 240. Exemplary embodiments for defining an ontology (such as ontology 250) are described in U.S. Pat. No. 7,962,495 (the '495 Patent), issued Jun. 14, 2011, the entire contents of which are expressly incorporated herein by reference. Among other things, the '495 patent describes embodiments that define a dynamic ontology for use in creating data in a database. For creating a database ontology, one or more object types are created where each object type can include one or more properties. The attributes of object types or property types of the ontology can be edited or modified at any time. And for each property type, at least one parser definition is created. The attributes of a parser definition can be edited or modified at any time.

In some embodiments, each property type is declared to be representative of one or more object types. A property type is representative of an object type when the property type is intuitively associated with the object type. For example, a property type of "Social Security Number" may be representative of an object type "Person" but not representative of an object type "Business."

In some embodiments, each property type has one or more components and a base type. In some embodiments, a property type may comprise a string, a date, a number, or a composite type consisting of two or more string, date, or number elements. Thus, property types are extensible and can represent complex data structures. Further, a parser definition can reference a component of a complex property type as a unit or token.

An example of a property having multiple components is a Name property having a Last Name component and a First Name component. An example of raw input data is "Smith, Jane." An example parser definition specifies an association of imported input data to object property components as follows: {LAST_NAME}, {FIRST_NAME}→Name:Last, Name:First. In some embodiments, the association {LAST_NAME}, {FIRST_NAME} is defined in a parser definition using regular expression symbology. The association {LAST_NAME}, {FIRST_NAME} indicates that a last name string followed by a first name string comprises valid input data for a property of type Name. In contrast, input data of "Smith Jane" would not be valid for the specified parser definition, but a user could create a second parser definition that does match input data of "Smith Jane." The definition Name:Last, Name:First specifies that matching input data values map to components named "Last" and "First" of the Name property.

As a result, parsing the input data using the parser definition results in assigning the value "Smith" to the Name:Last component of the Name property, and the value "Jane" to the Name:First component of the Name property.

Referring to FIG. 2, schema map 240 can define how various elements of schemas 235 for data sources 230 map to various elements of ontology 250. Definition component 210 receives, calculates, extracts, or otherwise identifies schemas 235 for data sources 230. Schemas 235 define the structure of data sources 230—for example, the names and other characteristics of tables, files, columns, fields, properties, and so forth. Definition component 210 furthermore optionally identifies sample data 236 from data sources 230. Definition component 210 can further identify object type, relationship, and property definitions from ontology 250, if any already exist. Definition component 210 can further identify pre-existing mappings from schema map 240, if such mappings exist.

Based on the identified information, definition component 210 can generate a graphical interface 215. Graphical interface 215 can be presented to users of a computing device via any suitable output mechanism (e.g., a display screen, an image projection, etc.), and can further accept input from users of the computing device via any suitable input mechanism (e.g., a keyboard, a mouse, a touch screen interface). Graphical interface 215 features a visual workspace that visually depicts representations of the elements of ontology 250 for which mappings are defined in schema map 240. Graphical interface 215 also includes controls for adding new elements to schema map 240 and/or ontology 250, including objects, properties of objects, and relationships, via the visual workspace. After elements of ontology 250 are represented in the visual workspace, graphical interface 215 can further provide controls in association with the representations that allow for modifying the elements of ontology 250 and identifying how the elements of ontology 250 correspond to elements of schemas 235. Optionally, the graphical interface 215 can further utilize sample data 236 to provide the user with a preview of object model 260 as the user defines schema map 240. In response to the input via the various controls of graphical interface 215, definition component 210 can generate and/or modify ontology 250 and schema map 240.

In some embodiments, graphical interface 215 can provide an interface providing a user with the ability to add structure to an unstructured document stored in data sources 230 by tagging one or more portions (e.g., text) within the document. Defining tags and applying these tags to a portion of the document can create object, properties, or links creating a relationship between one or more objects and/or properties.

Transformation component 220 can be invoked after schema map 240 and ontology 250 have been defined or redefined. Transformation component 220 identifies schema map 240 and ontology 250. Transformation component 220 further reads data sources 230 and identifies schemas 235 for data sources 230. For each element of ontology 250 described in schema map 240, transformation component 220 iterates through some or all of the data items of data sources 230, generating elements of object model 260 in the manner specified by schema map 240. In some embodiments, transformation component 220 can store a representation of each generated element of object model 260 in a database 270. In some embodiments, transformation component 220 is further configured to synchronize changes in object model 260 back to data sources 230.

Data sources 230 can be one or more sources of data, including, without limitation, spreadsheet files, databases, email folders, document collections, media collections, contact directories, and so forth. Data sources 230 can include structured data (e.g., a database, a .csv file, or any tab delimited or fixed-width file), semi-structured data (e.g., an email, an email server, or forms such as a suspicious activity report or currency transaction report), or unstructured data (e.g., encoded files such as PDF, sound, and image files). Data sources 230 can include data structures stored persistently in non-volatile memory. Data sources 230 can also or alternatively include temporary data structures generated from underlying data sources via data extraction components, such as a result set returned from a database server executing a database query.

Schema map 240, ontology 250, and schemas 235 can be stored in any suitable data structure(s), such as XML files, database tables, and so forth. In some embodiments, ontology 250 is maintained persistently. Schema map 240 can or cannot be maintained persistently, depending on whether the transformation process is perpetual or a one-time event. Schemas 235 need not be maintained in persistent memory, but can be cached for optimization.

Object model 260 comprises collections of elements such as typed objects, properties, and relationships. The collections can be structured in any suitable manner. In some embodiments, a database 270 stores the elements of object model 260, or representations thereof. In some embodiments, the elements of object model 260 are stored within database 270 in a different underlying format, such as in a series of object, property, and relationship tables in a relational database.

Embodiments disclosed herein are directed, among other things, to systems and methods that allow the user to define which information is relevant and which is not, and to automatically collect the data from one or more documents. More specifically, the systems and methods allow the user to indicate the desired object characteristics based on one or more sample documents, to indicate one or more target documents, and to automatically obtain and store those objects within the targets documents that correspond to (that are characterized by) the indicated desired characteristics.

The target documents can be webpages or documents unrelated to web. For example, the documents can include files such as HTML, Javascript, PHP, XML, Microsoft Word, Microsoft Excel, PDF, and other types of files. A document can comprise one or more objects. For example, an HTML file can comprise one or more HTML elements; and a Microsoft Excel file can comprise one or more sheets, rows, columns, and cells, each of which can be considered an object. The objects can also include pages, paragraphs, sentences, words, and characters.

In some embodiments, some or all objects within the document can be arranged in a hierarchical manner. For example, the document can conform to a Document Object Model (DOM), where the objects are arranged in a tree, each object having a parent object and/or one or more child objects.

FIGS. 3A and 3B illustrate an HTML code of an exemplary webpage 300 and webpage 300 as rendered by a web browser, respectively. Webpage 300 can include one or more HTML elements 310 (e.g., HTML elements 310a, 310b, 310c, 310d, and 310e), where the content of each HTML element 310 can be enclosed between a start tag (e.g., "<a>") and an end tag (e.g., "</a>"), and the attributes can be specified within the start tag (e.g., href="http://en.wikipedia.org/wiki/Leonardo_DiCaprio"). Some elements, such as text, images, and hyperlinks, can be visible to the user when rendered, while other elements may not be visible, and can instead serve as instructions to the browser rendering the webpage.

As mentioned above, the objects (e.g., HTML elements 310) can be arranged in a hierarchical manner. In some embodiments, the objects are arranged in a tree, where each element can have only one parent element and any number of child elements. For example, the webpage in FIGS. 3A and 3B includes an <HTML> element, which is a parent of a <HEAD> element and of a <BODY> element, where the <BODY> element is a parent of a <TABLE> element, which is a parent of two <TR> elements, each being a parent of one <TH> element and one <TD> element, and so forth.

Figure 4:
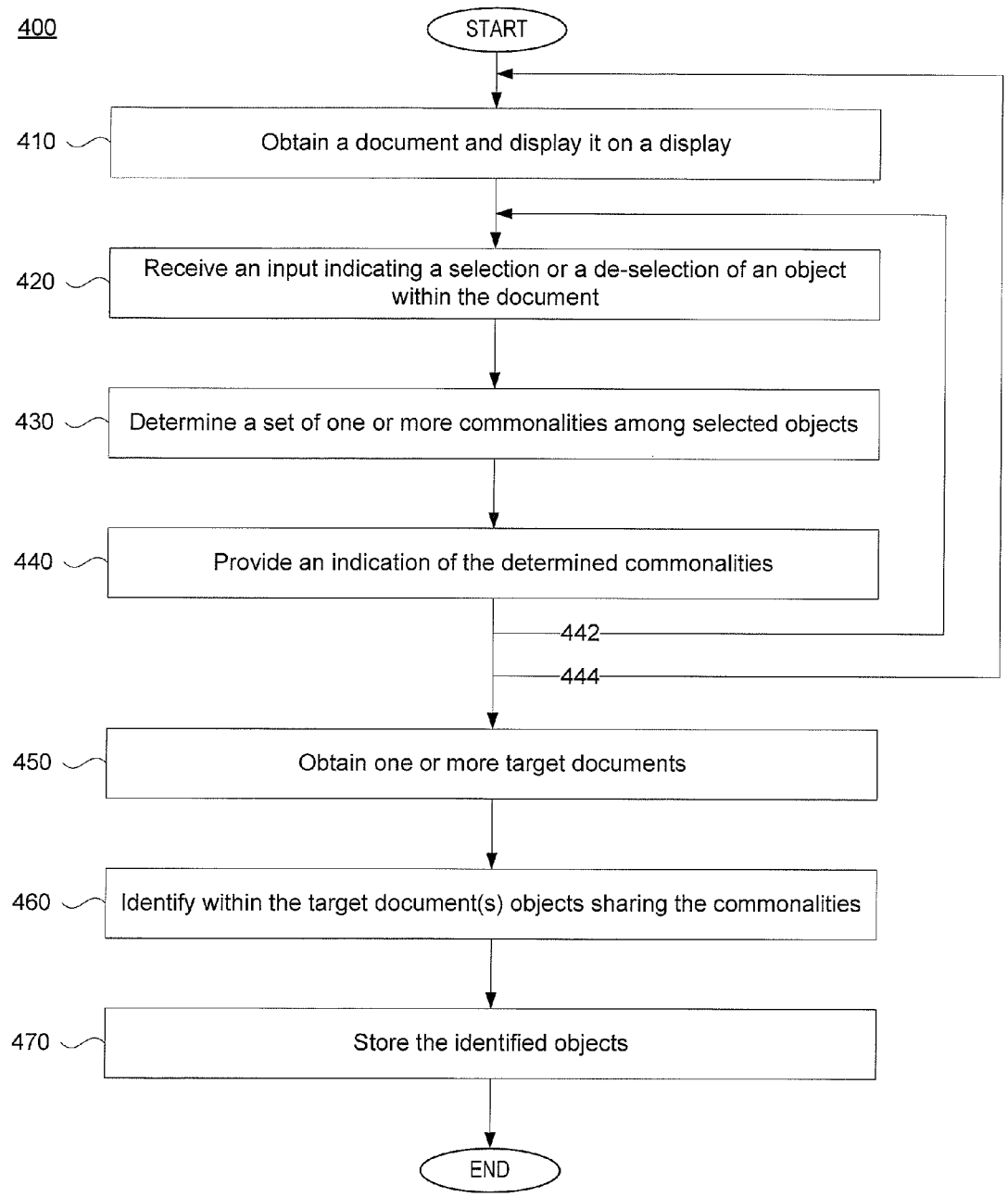
FIG. 4 is a flowchart of an exemplary method for visual definition of data associations, consistent with embodiments of the present disclosure.

Referring now to FIG. 4, a flowchart representing an exemplary method 400 of visual definition of data associations is presented. Method 400 can be performed by one or more electronic devices, such as electronic device 110. While method 400 and the other following embodiments described herein can be performed by multiple electronic devices each having one or more processors, for purposes of simplicity and without limitation, these embodiments will be explained with respect to a single electronic device (e.g., electronic device 110) having a single processor (e.g., processor 104). In some embodiments, method 400 can be implemented as part of a web browser application run by electronic device 110, or as part of an extension (an add-on) to a web browser. While the flowchart discloses the following steps in a particular order, it is appreciated that at least some of the steps can be moved, modified, or deleted where appropriate, consistent with the teachings of the present disclosure.

At step 410, the electronic device obtains a sample document and displays it on a display. For example, the user can navigate the browser to the desired webpage, which can be stored locally or on a remote server. The electronic device can then obtain one or more files associated with the webpage (e.g., HTML source code provided in FIG. 3A), and based on the content of the files, render the webpage on the display (e.g., rendered webpage 300 provided in FIG. 3B).

At step 420, the electronic device receives an input indicating selection of an object within the displayed sample document. For example, the object can be an HTML element, and the user can select the HTML element by left-clicking (clicking with the left button of a mouse) at or near the display location of the HTML element.

In some embodiments, the electronic device can facilitate the selection process by providing a visual indication of an HTML element that is associated with the current position of the mouse pointer. For example, the electronic device can display a frame around the HTML element over which the mouse pointer is hovering, that is, around the area associated with an HTML element located at or near the current position of the mouse pointer. In some embodiments, the electronic device identifies, among all the HTML elements, the HTML that is rendered closest to the mouse pointer position. In some embodiments, the electronic device identifies the closest HTML element among HTML elements that have some visual representation (e.g., a visual representation visible to the user when the webpage is rendered). Such elements can include, for example, elements that, when rendered, include any combination of text, imagery, graphics, individual lines, or any other visual representation.

Figure 5A:
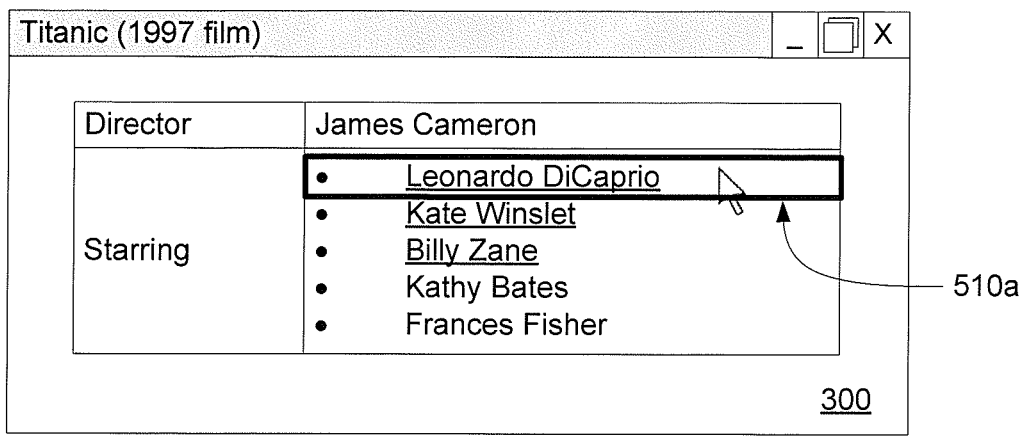
FIGS. 5A and 5B illustrate exemplary webpages having visual indications of HTML elements being associated with the current position of the mouse pointer, consistent with embodiments of the present disclosure.
Figure 5B:
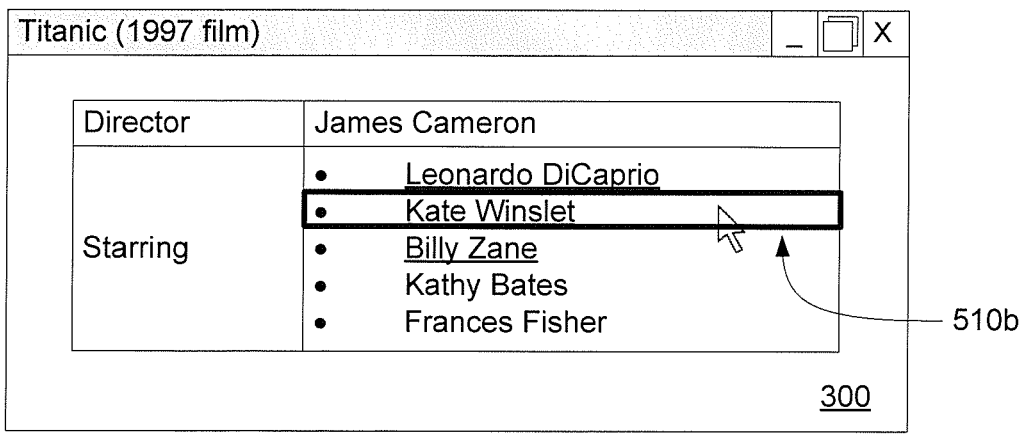

For example, as depicted in FIG. 5A, when the mouse pointer is located at or near HTML element 510a (i.e., the hyperlink to Leonardo DiCaprio's Wikipedia page) the electronic device can display a frame 510a around the area associated with HTML element 310a because that is the closest textual HTML element to the mouse pointer. As another example, as depicted in FIG. 5B, when the user moves the mouse pointer closer to HTML element 510b (i.e., the hyperlink to Kate Winslet's Wikipedia page) the electronic device can display a frame 510b around the area associated with that element.

The visual indication described above informs the user as to which object (e.g., HTML element) would be selected if the user left-clicked at the current position of the mouse pointer. When the user left-clicks at that position, the object is selected, and the method can proceed to step 430. Selected objects can optionally be highlighted by the electronic device, either using the same frame as used to provide visual indication, or another type of highlighting, such as a frame of a different color.

In some embodiments, at step 420 the user can also de-select any of the previously selected objects by selecting (e.g., left-clicking) that object again. In some embodiments, the selection and de-selection of the elements can be performed by the user using any other suitable input devices, such as a touchpad, a touchscreen, a keyboard, etc. In some embodiments, the object selections can be pre-stored in a volatile or non-volatile memory accessible by the electronic device, in which case no manual operation by the user may be required.

At step 430, the electronic device examines one or more previously selected objects and determines a set of one or more commonalities among those objects, that is, a set of one or more object characteristics characterizing each of those objects. Object characteristics can include, for example, the object's hierarchical position, that is, the object's position within the object hierarchy of the sample document. For example, one object characteristic of an HTML element is that element's hierarchical position within the HTML tree of the HTML webpage. Determining which object characteristics are common to the selected HTML elements can include, for example, determining the closest common ancestor (par-ent, grandparent, grand-grandparent, etc.) of those HTML elements. For example, the closest common ancestor of HTML elements 310a, 310b, 310c, 310d, and 310e is the unordered list element (<ul>).

Object characteristics can also include the object's type, such as the HTML element type (e.g., a hyperlink <a>, a table cell <td>, a paragraph <b>, and so forth). Object characteristics can also include one or more of the object's attributes, such as HTML attributes, which can include, for example, the element's formatting (e.g., font type, size, color, bold, italics, underline, and so forth). Thus, for example, determining which object characteristics are common to the selected HTML elements can include determining whether the HTML elements are of the same type, and if so, which attributes they have in common.

Object characteristics can also include the object's content, such as the content that is within the start and end tags of an HTML element (e.g., the text "Starring"). Thus, determining which object characteristics are common to the selected HTML elements can include determining whether the elements have the same content or, in some embodiments, whether at least some parts of the content (e.g., one or more words) are the same.

While specific examples of object characteristics that can be examined by the electronic device at step 430 were described above, it will be appreciated that the electronic device can examine any combination of these or other characteristics associated with the selected objects. Moreover, in determining the commonalities among the characteristics of the selected objects, the electronic device can use a heuristic approach, for example, assigning different weights to different types of characteristics.

In the example illustrated in FIG. 6A, HTML elements 310a and 310b are selected at step 420. In this example, the electronic device can determine at step 430 a set of two commonalities shared by the selected elements: 1) they share the same parent element (the unordered list <ul>); and 2) they are both elements of the same type (hyperlink <a>). The electronic device can determine additional commonalities (e.g., elements 310a and 310b also have the same font), but in some embodiments, the electronic device can disregard some commonalities and not include them in the set. The electronic device can then proceed to step 440.

At step 440, the electronic device can provide the user with some indication of the commonalities that were determined at step 430. For example, the electronic device can display a textual representation of the determined commonalities, for example, by displaying, for each commonality a name-value pair, where the name represents the type of shared characteristic (e.g., hierarchical position, object type, content, etc.) and the value represents the shared value.

As another example, the electronic device can determine which other objects within the sample document have the same commonalities (i.e., share the same characteristics as the selected objects) and highlight those objects, for example, using the same type of highlighting as used to highlight the selected objects. Thus, the electronic device can determine and highlight all objects (previously selected or not) within the sample document that share the set of commonalities determined at step 430. Referring to the example illustrated above, after HTML elements 310a and 310b were selected and highlighted (as illustrated in FIG. 6A), and the electronic device determined that the elements share a set of two commonalities (they are hyperlink children of the element <ul>) the electronic device can highlight other hyperlink children of the element <ul>. In this example, this includes only HTML element 310c, because even though HTML elements 310d and 310*e* are also children of the element <ul>, they are not hyperlinks. Thus, as illustrated in FIG. 6B, after the user selects elements 310*a* and 310*b*, the electronic device automatically highlights elements 310*a* and 310*b* (at step 420) as well as element 310*c* (at step 440), which gives the user an instant indication of all the objects within the sample document sharing the commonalities of the selected objects. As illustrated in FIG. 6B, elements selected by the user at step 420 can be highlighted with a different type of highlighting than elements automatically highlighted by the electronic device at step 440.

Based on the feedback provided by this instant indication, the user can easily deduct which commonalities were determined by the electronic device, and make any necessary adjustments by selecting additional objects or deselecting previously selected objects. When the electronic device detects (442) a new selection or de-selection, it can repeat steps 410-440 for the new set of selected objects within the obtained sample document. In the example illustrated in FIG. 7A, after selecting objects 310*a* and 310*b*, after which object 310*c* was automatically highlighted by the electronic device, the user can also select element 310*e*. In this example, the electronic device receives this new input and highlights the newly selected element 310*e* at step 420, and proceeds to determine, at step 430, a new set of one or more commonalities among all the selected elements 310*a*, 310*b*, and 310*e*. In this example, the electronic device can determine that the new set of commonalities includes only one commonality, a shared parent element <ul>, because the elements no longer share the object type, since not all of them are hyperlinks. The electronic device then proceeds to step 440 where it provides the user with an indication of the new set of commonalities, for example, by highlighting all the objects within the sample document that share the commonalities. As illustrated in FIG. 7B, in this example, in addition to the previously highlighted element 310*c*, the electronic device highlights element 310*d*, because it is also a child of the element <ul>.

In some embodiments, the user can also select, at step 420, one or more excluded objects. For example, the user can select those objects with a right-click of a mouse, and the electronic device can highlight the excluded objects with a different type of highlighting, such as a frame of a different color than that used for highlighting the selected objects described above. The electronic device can then add the selected objects to a set of excluded objects and refer to this set at later stages, as discussed below.

In some embodiments, the electronic device can determine commonalities among objects of a plurality of sample documents. For example, after performing step 440 on one sample document, the electronic device can proceed (444) to step 410 where it can obtain another sample document and display it on a display. The other sample document can also be identified to the electronic device by the user—for example, the user can navigate the browser to another webpage, such as an exemplary webpage 800 illustrated in FIG. 8B.

In some embodiments, the user can identify a list of sample documents (e.g., webpages), and the electronic device can select randomly any document on the list, either systematically or randomly. For example, the user can specify an HTTP address of a webpage containing a list of hyperlinks to a plurality of movie webpages, such as a webpages containing hyperlinks to all major movies made between the years 2000 and 2009 The electronic can then systematically or randomly select one of those hyperlinks (e.g., webpage 800) and display it on the display.

After displaying the other sample document on the display, the electronic device can identify and highlight any objects within the other sample document that share the commonalities (i.e., that are characterized by the same characteristics) previously determined at step 430 based on the previous sample document. As illustrated in FIG. 8C, the electronic device can highlight objects 810*a* and 810*b*, because they share the commonalities of the objects selected on webpage 300, since they are also children of an element <ul> whose position within the HTML tree of webpage 800 is similar to the position of the <ul> element of webpage 300.

The user can then select, at step 420, additional objects in the other sample document or deselect any of the highlighted objects in the other sample document (not shown). The electronic device can then, at step 430, determine a new set of commonalities shared by all the previously selected objects of the previous sample document and by any objects selected in the other sample document. The electronic device can then proceed to indicate the new set of commonalities at step 440, and the process can be repeated for any number of sample documents and objects. In some embodiments, the electronic device can require that the sample documents have some similarities, for example, that they should all include the same or similar object structure. For example, if the sample documents are HTML webpages, the electronic device can require that the elements in each webpage are arranged in the same or similar tree structure. In other embodiments, the electronic device may set no limitations on the types of sample documents.

When the user decides, based on the indications at step 440, that he or she is satisfied with the set of determined commonalities, the user can instruct the electronic device to proceed to step 450. In some embodiments, the electronic device can proceed to step 450 automatically, unless the user instructs otherwise. In some embodiments, before proceeding to step 450, the electronic device can store the determined set of commonalities and set of excluded objects in a volatile or non-volatile memory (not shown) to be later retrieved from the memory at step 450. In these embodiments, step 450 and the following steps can be performed at a later time and/or by another electronic device, as long as the other electronic device can access the determined set of commonalities and set of excluded objects.

At step 450, the electronic device obtains one or more other target documents. Like the sample document(s) displayed at step 410, the target documents can be of any types and can include any types of objects. In some embodiments, the target documents are of the same type as the document displayed at step 410, and the electronic device can deny processing of other types of target documents.

In some embodiments, obtaining the target documents includes having the user provide the documents, for example, by specifying the address (e.g., a web address or a local path) of the documents. In other embodiments, obtaining the target documents includes accessing a memory (volatile or non-volatile) and obtaining from the memory a list of one or more target document addresses, or an address of a document containing a list of one or more target document addresses. The electronic device can then obtain the target document(s) based on those addresses. In some embodiments, the list of one or more document addresses can be obtained from an output of another method or of another instance of method 400, as will be described below. FIGS. 9A and 9B illustrate an HTML code and a rendered view, respectively, of an exemplary target document (in this example, a webpage 900) obtained by the electronic device at step 450.

At step 460, the electronic device identifies within the target document(s) one or more objects that share the commonalities obtained at step 430, that is, one or more objects that are characterized by the set of characteristics obtained at step 430. For example, if the set of commonalities obtained at step 430 included two commonalities: 1) parent element is <ul>, and 2) element type is a hyperlink, the electronic device can identify within webpage 900 any hyperlinks whose parent element is <ul>. Therefore, in this example, the electronic device identifies HTML elements 910*a*, 910*b*, and 910*d*, but not 910*c* which is not a hyperlink, as objects sharing the commonalities obtained at step 430.

In some embodiments, identifying whether a particular object shares the commonalities obtained at step 430 can include determining whether the characteristics of the particular object are sufficiently similar to the set of characteristics obtained at step 430. Sufficiently similar can mean, that the number of characteristics shared by the particular object is greater or equal to a predetermined threshold. The predetermined threshold can be equal to the size of the set of characteristics, meaning that all characteristics in the set must be shared by the particular object or, in some embodiments, it can be less than the size of the set of characteristics, meaning, for example, that if most, but not all the characteristics are shared, a particular object can still be identified by the electronic device as sufficiently similar. In some embodiments, the electronic device can assign different weights to different types of characteristics and identify objects for which the total weight of shared characteristics is equal or greater than a predetermined weight threshold. For example, if the set of characteristics (the commonalities) determined at step 430 includes a hierarchical position, the electronic device can assign higher weights to objects whose hierarchical position is closer to that hierarchical position.

In some embodiments, the electronic device can exclude from the identified objects any objects that correspond to (share similar characteristics with) any objects within the set of excluded objects discussed above.

At step 470, the electronic device can store the identified object(s) in a database, such as database 270 or data sources 230. The electronic device can store in the database any information associated with the objects, such as the object's contents (e.g., the string "Jeff Bridges" of element 910*a*), attributes (e.g., formatting), hierarchical position within the document, and so forth.

In some embodiments, in addition to object information retrieved from the target document, the electronic device can store qualifying information about the object. The user can provide the qualifying information to the electronic device, for example, through a user interface of a browser or browser add-on or extension. The qualifying information can describe, for example, the type or class of object. For example, the database can include different classes of object, such as "a person," "a movie," "a city," and so forth, and the electronic device can assign the object to one of the classes defined in the database.

The qualifying information can also describe a relationship between the stored object and other objects in the database. For example, the user can specify through a user interface that the stored object is a property of another object. For example, a "movie" object can have one or more properties such as "title," "director," "year," "actors," etc. Thus, for example, when the electronic device stores element 310*b* ("Kate Winslet"), it can store it with qualifying information that it is an actor property of a previously stored movie object having a title property "Titanic." As another example, the user can specify through a user interface the class of the stored object (e.g., "a person") and its relationship (e.g., "acted in") with another, previously stored object (e.g., a movie object having a title property "Titanic").

In some embodiments, the qualifying information can be provided by the user at step 420. That is, in addition to selecting one or more objects sharing the desired commonalities, the user can specify the type of these object and/or their relationships with other, previously stored objects. In some embodiments, the user can specify that information using an additional window or a frame appearing alongside with the displayed document (e.g., a webpage). The window or frame can be rendered by a browser or by a pre-installed browser extension or add-on. If the user specifies the qualifying for the selected objects, all the objects identified in target documents at step 460 and stored at step 470 can be stored together with, or in association with, that qualifying information.

In some embodiments, the user can specify, as part of the qualifying information, that the selected objects are references (e.g., hyperlinks) to target documents. In these embodiments, instead of or in addition to storing the identified objects into the database, the electronic device can store the references in memory, and use them for obtaining target documents at step 450 when it runs method 400 in the future. Thus, method 400 can be performed iteratively, where the output of one run can be fed as an input to step 450 of another run. This allows the user to define large numbers of target documents instead of having to manually specify each target document. For example, the user can first specify one target document (e.g., a webpage containing links to multiple movie webpages) and specify that the objects (e.g., movies) collected after the first run of method 400 are references. The user can then run the method a second time, and specify that the target documents are all the webpages collected by the first run. It is appreciated that the number of such iterations is unlimited.

Figure 10A:
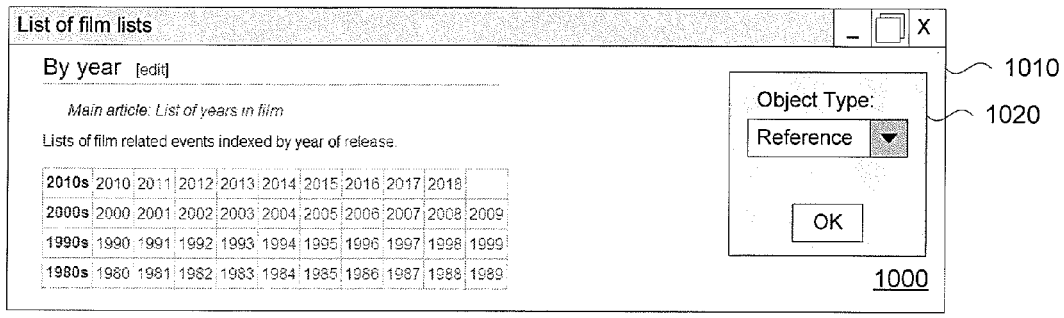
FIGS. 10A, 10B, and 10C illustrate exemplary webpages as rendered in a browser window having a browser extension window, consistent with embodiments of the present disclosure.

To illustrate the iterative application of method 400, FIG. 10A shows a browser window 1010 which includes a browser extension (add-on) window 1020. In this example, the user navigates the browser to a webpage 1000 that has a list of lists of films sorted, for example, by year. The user can then select one or more years, that is, HTML elements corresponding to specific years. As discussed above, the electronic device can assist the selection, for example, by providing a frame around an HTML element over which a mouse pointer is hovering at any given point in time. After each selection by the user, the electronic device can determine a set of commonalities, and highlight all objects that share the commonalities. For example, if the user selected years 2003 and 2004, the electronic device can highlight all the years in the row "2000s" because they are all located in the same row of the underlining HTML table element. If the user then selects a year 1995, for example, the selected years are no longer all in the same row but still share the commonality of being cells of the same table, and so the electronic device can highlight all the years in the table as objects sharing the commonality.

The user can then select "Reference" as the object type in browser extension window 1020, indicating that the objects collected at this page are references (hyperlinks) to target documents to be used later.

Figure 10B:
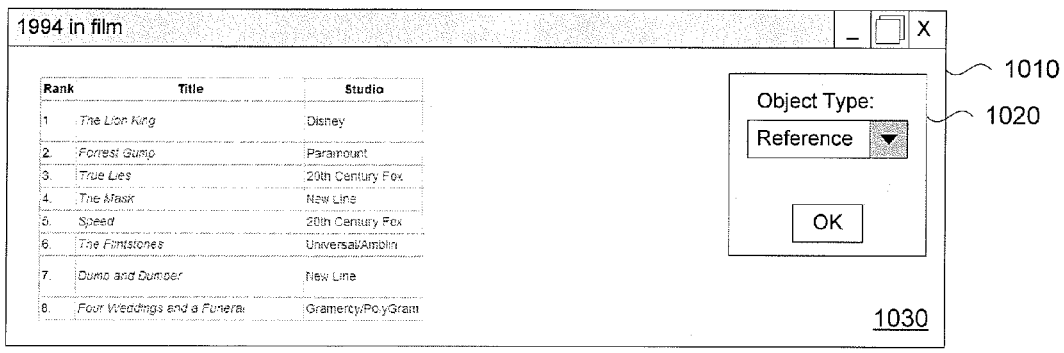

The electronic device can then select (e.g., at random or systematically) one of the hyperlinks and run method 400 again, using that hyperlink as the sample document. For example, the electronic device can select and render a webpage 1030 that corresponds to the hyperlink "1994" and that contains movies made in 1994, as illustrated in FIG. 10B. On webpage 1030, the user can select one or more hyperlinks in the "Title" column, after which the electronic device can determine that the commonality shared by the selected objects is that they all belong to a second column of the same table, and therefore the electronic device can highlight all the hyperlinks at the second column of that table.

Figure 10C:
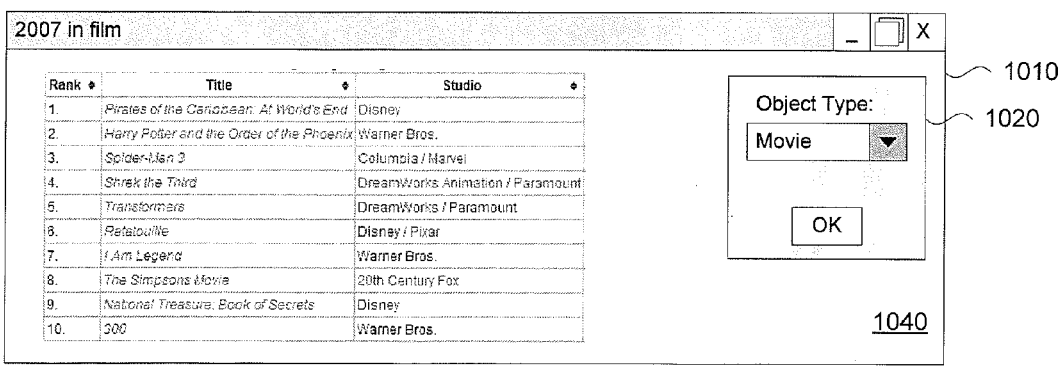

The electronic device can then select (e.g., at random or systematically) additional hyperlinks from webpage 1000, and use them as additional sample documents, allowing the user to refine the definition of the commonalities across multiple sample documents. For example, the electronic device can now select and render a webpage 1040 that corresponds to the hyperlink "2007," as illustrated in FIG. 10C. The electronic device can automatically highlight on webpage 1040 any objects that share the commonalities previously defined on page 1030, if any. For example, if the table in webpage 1040 is positioned at the same place in the HTML tree of the webpage as the table in webpage 1030, the electronic device can automatically highlight all the hyperlinks in the second column of the table in webpage 1040 because they share the previously defined commonalities. If, however, the table is positioned at a different place in a tree, or is otherwise different from the table in webpage 1030, the electronic device may not determine that the hyperlinks in the second column share the previously defined commonalities, and therefore will not highlight those hyperlinks. In this case, the user can manually select one or more hyperlinks in the second column, indicating to the electronic device that these hyperlinks should also be included and forcing the electronic device to re-determine the set of commonalities such that the second columns of both tables are highlighted.

The electronic device can repeat presenting sample webpages from the list of webpages collected from webpage 1000 in a similar fashion, allowing the user to refine the definition of the commonalities until the user is satisfied with the result. For example, if after a certain number of webpages, the user determines (by observing which objects are automatically highlighted by the electronic device at each presented webpage) that the commonalities determined by the electronic device encompass all movies at all the presented webpages (and therefore are likely to encompass all movies within all webpages referenced in webpage 1000) the user can stop refining the definition, and instruct the electronic device (e.g., via browser extension window 1020) to proceed to the next iteration of method 400. In some embodiments, to further facilitate the definition process, the electronic device can display two or more webpages on the same screen. For example, the browser extension can create two HTML frames, and show a different sample webpage at each frame, side by side, or one on top of the other. In these embodiments, the user's selection of objects on a webpage in one frame can be automatically reflected on the webpage in the other frame, because the processor performs a new determination of commonalities after each selection, and indicates the newly determined commonalities by highlighting all objects sharing the commonalities, on all the webpages rendered on the display.

In some embodiments, the user can indicate in browser extension window 1020 that the selected objects have object type "movie". The electronic device can identify and store information (e.g., title) for all the identified objects in all the webpages identified on webpage 1000, thereby storing information essentially for all movies of all years. Each movie can be stored, for example, as an object of type "movie" having a property "title" with a value corresponding to the movie's title.

Figure 11:
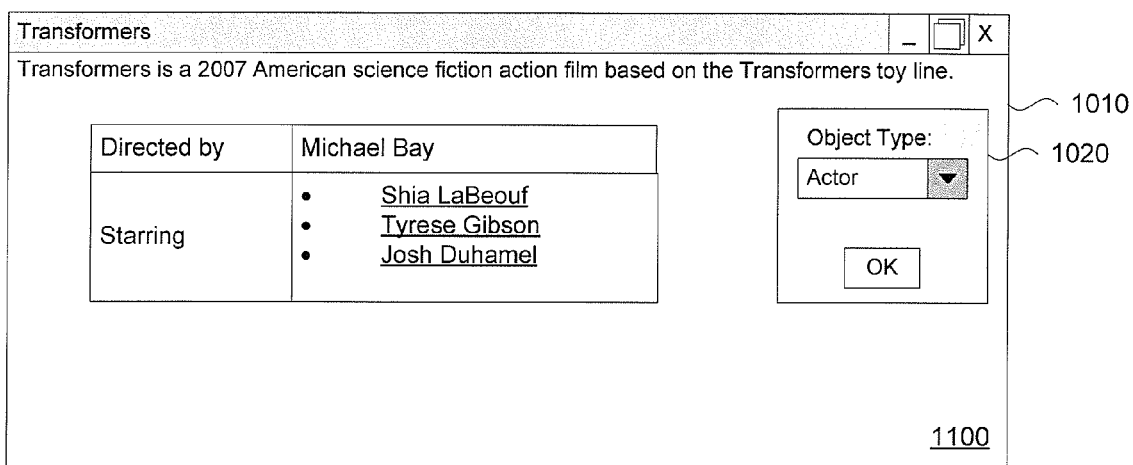
FIG. 11 illustrates an exemplary webpage as rendered in a browser window having a browser extension window, consistent with embodiments of the present disclosure.
Figure 12A:
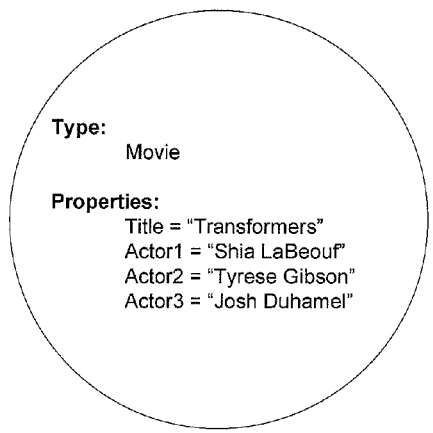
FIGS. 12A and 12B illustrate alternative ways of storing identified objects and their properties, consistent with embodiments of the present disclosure.
Figure 12B:
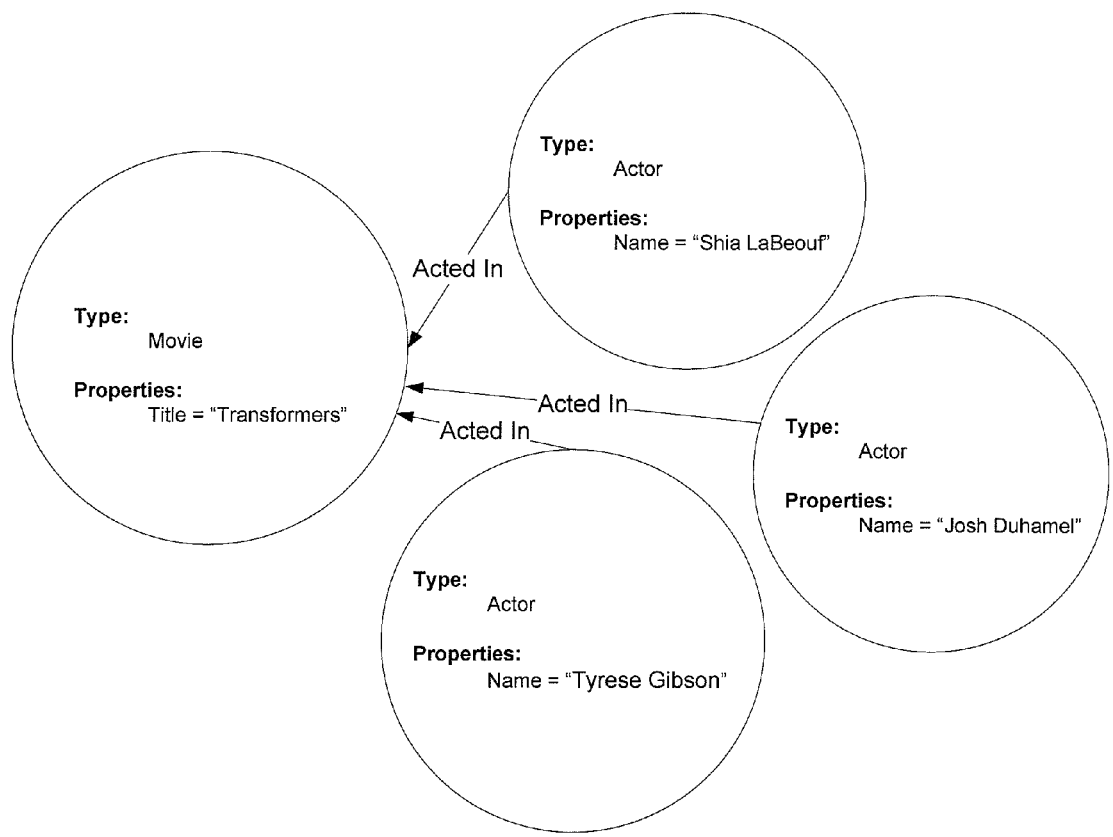

Instead or in addition to storing all movies as "movie" objects, the electronic device can run another iteration of method 400 on all individual movie webpages collected in the previous iteration, e.g., webpages of substantially all movies of all years. The electronic device can select (e.g., at random or systematically) one of the movie webpages and run method 400 again, using that webpage as the sample document. For example, the electronic device can select and render a webpage 1100 corresponding to the movie Transformers, as illustrated in FIG. 11. On webpage 1100, the user can select, for example, one or more hyperlinks corresponding to actors acting in that movie, after which the electronic device can determine the commonalities and highlight all other actors, as discussed above. The process can be repeated on other sample movie webpages, as discussed above. Then, when the user determines, based on the visual indications (highlighting) that the commonalities encompass all actors at all movie webpages, the user can instruct the electronic device (e.g., by pressing a designated button in browser extension window 1020) to store information on all actors of all movies. In some embodiments, the electronic device can store information about each actor as an "actor" property of a "movie" object in which the actor played. For example, the processor can add to the previously stored movie objects properties of type "actor", and populate those properties with the corresponding actors information, as illustrated in FIG. 12A. Alternatively, the processor can create a new object of type "actor" and indicate that the new object is related to another object of type "movie" by a relationship of type "acted in," as illustrated in FIG. 12B.

Embodiments of the present disclosure have been described herein with reference to numerous specific details that can vary from implementation to implementation. Certain adaptations and modifications of the described embodiments can be made. Other embodiments can be apparent to those skilled in the art from consideration of the specification and practice of the embodiments disclosed herein. It is intended that the specification and examples be considered as exemplary only, with a true scope and spirit of the present disclosure being indicated by the following claims. It is also intended that the sequence of steps shown in figures are only for illustrative purposes and are not intended to be limited to any particular sequence of steps. As such, it is appreciated that these steps can be performed in a different order while implementing the exemplary methods or processes disclosed herein.

What is claimed is:

1. An electronic device comprising:
one or more computer-readable storage media configured to store instructions; and
one or more processors configured to execute the instructions to cause the electronic device to:
obtain and display a first sample document;
receive a first input indicating selection of one or more objects within the first sample document;
determine a first set of one or more characteristics shared by the selected objects;
identify, within one or more target documents, one or more target objects characterized by the first set of one or more characteristics;
store object data associated with the target objects;
obtain and display a second sample document;
receive a second input indicating selection of one or more objects within the second sample document; and
determine a second set of one or more characteristics shared by objects selected in the first and second sample documents, wherein the first and second sample documents are HTML documents, wherein the one or more objects within the first and second sample documents are HTML elements, and wherein the determination of the second set of characteristics comprises a determination of commonalities among hierarchical positions of the HTML elements within the HTML documents.

2. The electronic device of claim 1, wherein the one or more processors are further configured to execute the instructions to cause the electronic device to:
highlight, within the first sample document, the selected objects and any other objects characterized by the first set of characteristics.

3. The electronic device of claim 1, wherein the one or more processors are further configured to execute the instructions to cause the electronic device to:
receive a third input indicating selection of one or more additional objects or de-selection of one or more previously selected objects; and
determine a third set of characteristics based on the first and third inputs.

4. The electronic device of claim 1, wherein the first sample document is an HTML document, wherein the one or more objects are HTML elements, and wherein the determination of the first set of characteristics comprises a determination of commonalities among hierarchical positions of the HTML elements within the HTML document.

5. The electronic device of claim 1, wherein the one or more processors are further configured to execute the instructions to cause the electronic device to provide a visual indication of an object being associated with a current position of a mouse pointer.

6. The electronic device of claim 1, wherein the one or more processors are further configured to execute the instructions to cause the electronic device to obtain the target documents based on target objects obtained by a previously run method.

7. A method performed by at least one electronic device comprising one or more processors, the method comprising:
obtaining and displaying a first sample document;
receiving a first input indicating selection of one or more objects within the first sample document;
determining a first set of one or more characteristics shared by the selected objects;
identifying, within one or more target documents, one or more target objects characterized by the first set of one or more characteristics;
storing object data associated with the target objects;
obtaining and displaying a second sample document;
receiving a second input indicating selection of one or more objects within the second sample document; and
determining a second set of one or more characteristics shared by objects selected in the first and second sample documents, wherein the first and second sample documents are HTML documents, wherein the one or more objects within the first and second sample documents are HTML elements, and wherein determining the second set of characteristics comprises determining commonalities among hierarchical positions of the HTML elements within the HTML documents.

8. The method of claim 7, further comprising:
highlighting, within the first sample document, the selected objects and any other objects characterized by the first set of characteristics.

9. The method of claim 7, further comprising:
receiving a third input indicating selection of one or more additional objects or de-selection of one or more previously selected objects; and
determining a third set of characteristics based on the first and third inputs.

10. The method of claim 7, wherein the first sample document is an HTML document, wherein the one or more objects are HTML elements, and wherein determining the first set of characteristics comprises determining commonalities among hierarchical positions of the HTML elements within the HTML document.

11. The method of claim 7, further comprising providing a visual indication of an object being associated with a current position of a mouse pointer.

12. The method of claim 7, further comprising obtaining the target documents based on target objects obtained by a previously run method.

13. A non-transitory computer-readable medium storing a set of instructions that are executable by one or more electronic devices, each having one or more processors, to cause the one or more electronic devices to perform a method, the method comprising:
obtaining and displaying a first sample document;
receiving a first input indicating selection of one or more objects within the first sample document;
determining a first set of one or more characteristics shared by the selected objects;
identifying, within one or more target documents, one or more target objects characterized by the first set of one or more characteristics;
storing object data associated with the target objects;
obtaining and displaying a second sample document;
receiving a second input indicating selection of one or more objects within the second sample document; and
determining a second set of one or more characteristics shared by objects selected in the first and second sample documents, wherein the first and second sample documents are HTML documents, wherein the one or more objects within the first and second sample documents are HTML elements, and wherein determining the second set of characteristics comprises determining commonalities among hierarchical positions of the HTML elements within the HTML documents.

14. The non-transitory computer-readable medium of claim 13, further comprising instructions executable by the one or more electronic devices to cause the one or more electronic devices to perform:
highlighting, within the first sample document, the selected objects and any other objects characterized by the first set of characteristics.

* * * * *